United States Patent
Wang et al.

(10) Patent No.: US 11,206,108 B2
(45) Date of Patent: Dec. 21, 2021

(54) METHOD AND DEVICE FOR TRANSMITTING DATA

(71) Applicant: Samsung Electronics Co., Ltd., Suwon-si (KR)

(72) Inventors: Yi Wang, Beijing (CN); Shichang Zhang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 16/475,917

(22) PCT Filed: Jan. 3, 2018

(86) PCT No.: PCT/KR2018/000089
§ 371 (c)(1),
(2) Date: Jul. 3, 2019

(87) PCT Pub. No.: WO2018/128369
PCT Pub. Date: Jul. 12, 2018

(65) Prior Publication Data
US 2021/0135791 A1    May 6, 2021

(30) Foreign Application Priority Data

Jan. 3, 2017 (CN) .......................... 201710002110.5
Jan. 25, 2017 (CN) ......................... 201710061162.X
(Continued)

(51) Int. Cl.
*H04L 1/18* (2006.01)
*H04L 5/00* (2006.01)
*H04W 72/12* (2009.01)

(52) U.S. Cl.
CPC .......... *H04L 1/1812* (2013.01); *H04L 1/1864* (2013.01); *H04L 5/0053* (2013.01); *H04W 72/1278* (2013.01)

(58) Field of Classification Search
CPC ..... H04L 1/1812; H04L 5/0053; H04L 5/001; H04L 5/0092; H04L 1/1819;
(Continued)

(56) References Cited

U.S. PATENT DOCUMENTS 8,780,821 B2 * 7/2014 Zhang .................. H04L 5/0007
                                                          370/329
9,357,544 B2 * 5/2016 Chen ..................... H04L 5/0035
(Continued)

FOREIGN PATENT DOCUMENTS

KR      10-1577437 B1    12/2015
KR    10-2016-0110493 A    9/2016
(Continued)

OTHER PUBLICATIONS

Samsung, "Multiplexing NR-PDCCH and PDSCH", 3GPP TSG RAN WG1 Meeting #90, Prague, Czechia, Aug. 21-25, 2017, R1-1713615.
(Continued)

*Primary Examiner* — Hanh N Nguyen
(74) *Attorney, Agent, or Firm* — Jefferson IP Law, LLP

(57) ABSTRACT

The present application provides a method for transmitting data, which includes the following. A UE detects a physical downlink control channel, PDCCH, on a configured control resource set; the UE analyzes the detected PDCCH, and determines a method for dividing code blocks, CBs, and a method for rate matching of a physical downlink shared channel, PDSCH, and receives the PDSCH accordingly. By the method of the present application, when a service with a low delay requirement punches the time-frequency
(Continued)

resources of other services, a performance of the other services is improved as much as possible, and the resource utilization rate is improved as much as possible.

13 Claims, 6 Drawing Sheets

(30) Foreign Application Priority Data

| Mar. 14, 2017 | (CN) | 201710150514.9 |
|---|---|---|
| Apr. 27, 2017 | (CN) | 201710288177.X |
| Jul. 7, 2017 | (CN) | 201710551538.5 |

(58) Field of Classification Search
CPC . H04L 5/0051; H04L 5/0048; H04L 72/0446; H04L 72/0453; H04L 72/1294; H04L 1/10003; H04L 1/10009; H04L 1/0067; H04L 1/0075; H04L 5/0055; H04L 1/0013; H04L 1/0057; H04L 1/0068; H04L 5/0007; H04L 5/0064; H04L 5/0094; H04W 1/1864; H04W 72/12; H04W 72/1284; H04W 72/1289; H04W 72/042; H04W 72/1278; H04W 24/08
See application file for complete search history.

(56) References Cited

U.S. PATENT DOCUMENTS

| 9,654,584 | B2 | 5/2017 | Han et al. | |
|---|---|---|---|---|
| 10,673,573 | B2* | 6/2020 | Wang | H04L 1/1812 |
| 11,013,063 | B2* | 5/2021 | Kwon | H04W 88/06 |
| 2013/0039284 | A1 | 2/2013 | Marinier et al. | |
| 2015/0236826 | A1* | 8/2015 | Liu | H04L 5/0035 |
| | | | | 370/329 |
| 2015/0382362 | A1* | 12/2015 | Park | H04W 72/082 |
| | | | | 370/330 |
| 2016/0191225 | A1 | 6/2016 | Hwang et al. | |
| 2016/0205679 | A1* | 7/2016 | Yoo | H04L 5/0057 |
| | | | | 370/329 |
| 2017/0223687 | A1* | 8/2017 | Kuchibhotla | H04L 5/0094 |
| 2019/0349806 | A1* | 11/2019 | Nam | H04W 28/0263 |
| 2020/0068410 | A1 | 2/2020 | Seo et al. | |

FOREIGN PATENT DOCUMENTS

| WO | 2012/047829 A1 | 4/2012 |
|---|---|---|
| WO | 2014/003456 A1 | 1/2014 |
| WO | 2016/003229 A1 | 1/2016 |

OTHER PUBLICATIONS

European Office Action dated Jul. 6, 2021, issued in European Patent Application No. 18736519.2-1216.

* cited by examiner

[Fig. 1]
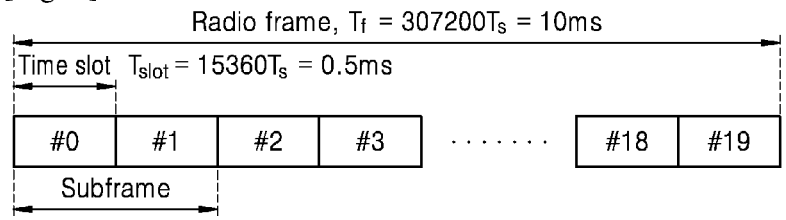
[Fig. 2]
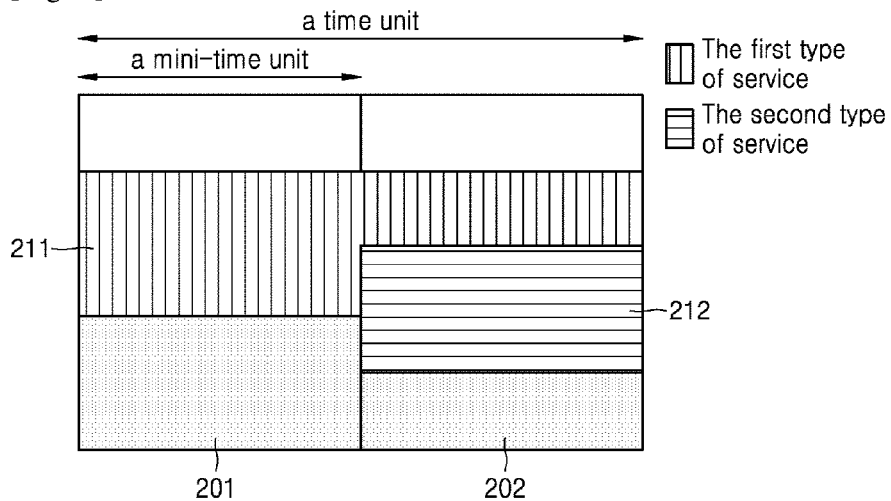
[Fig. 3]
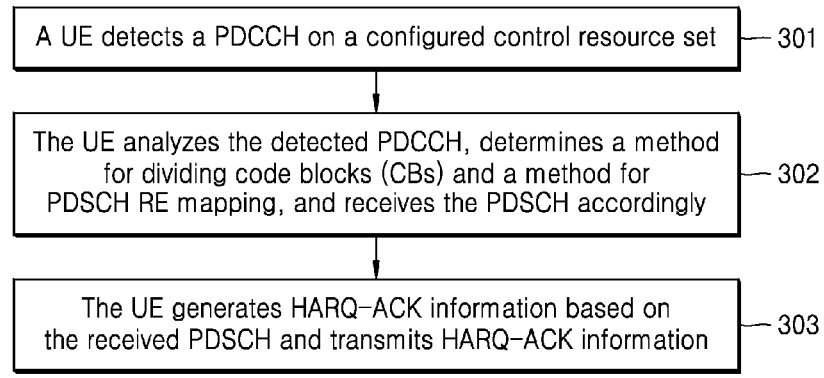
[Fig. 4]
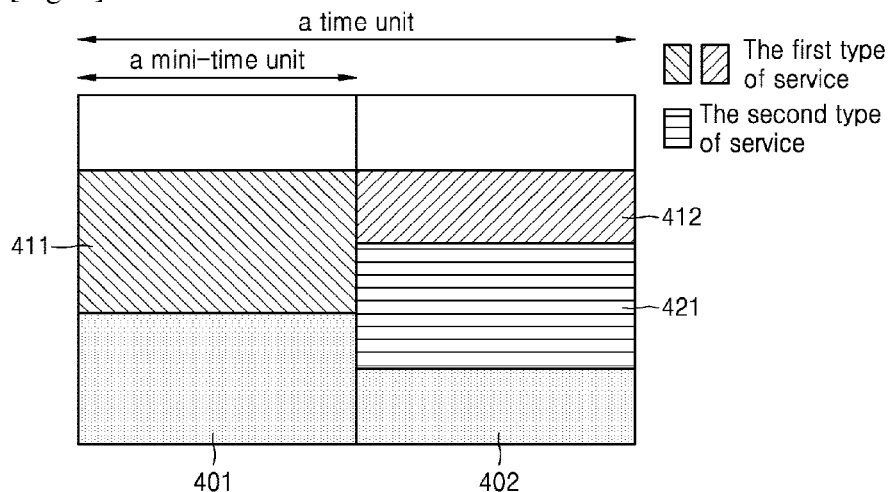

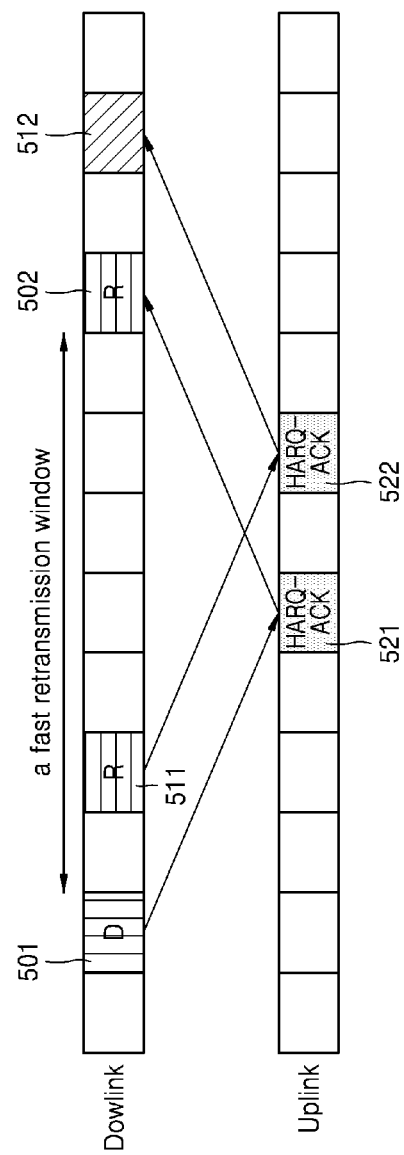

[Fig. 6]
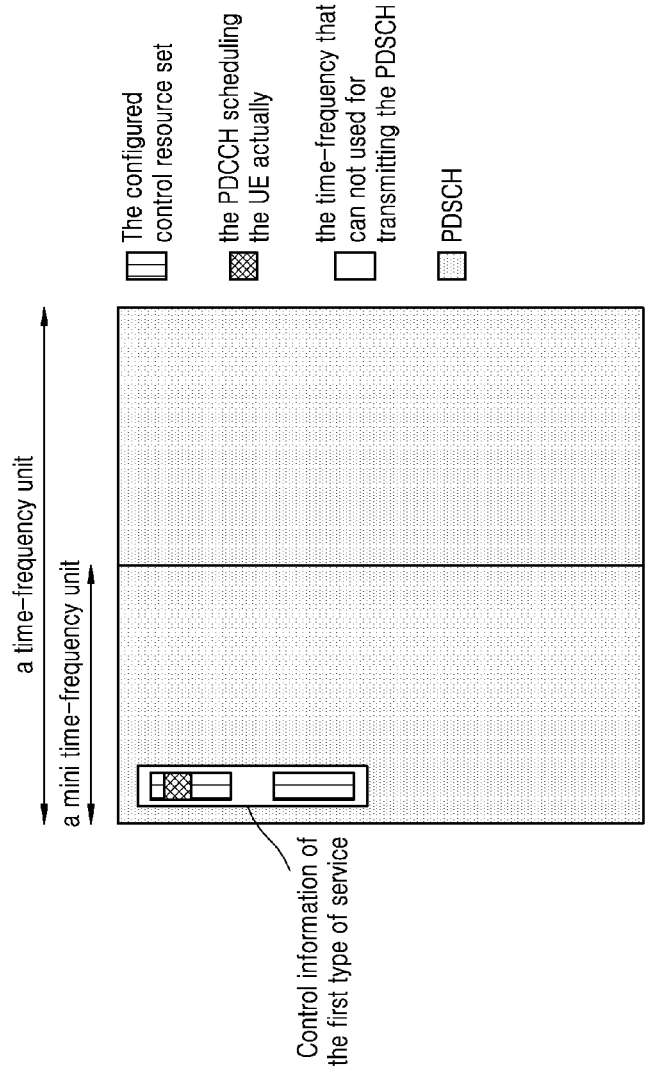

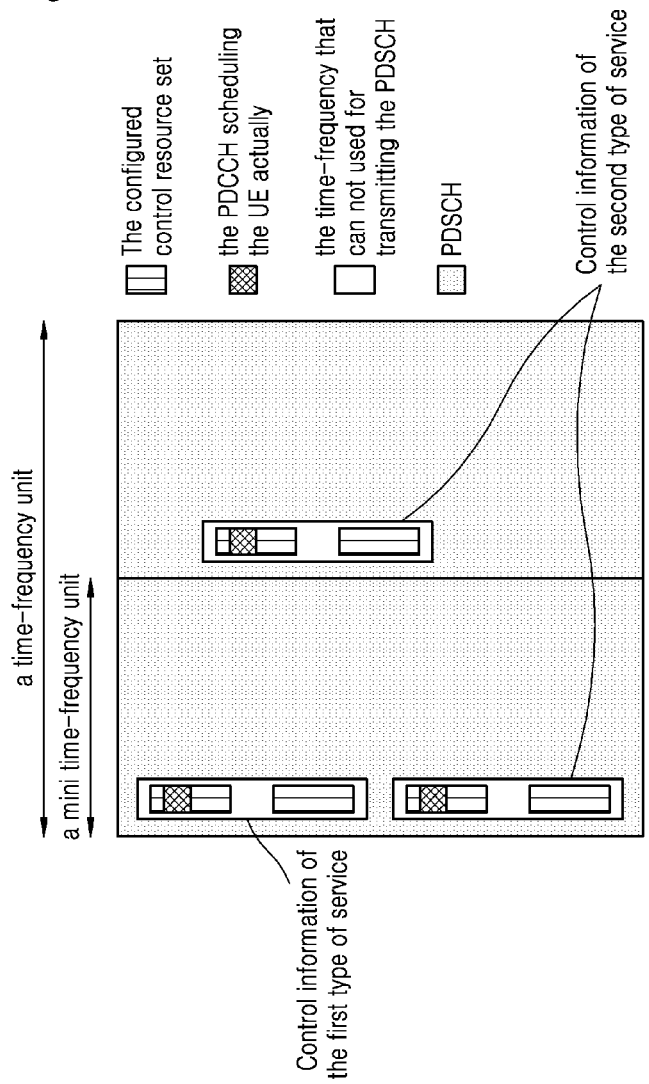
[Fig. 7]

[Fig. 8]
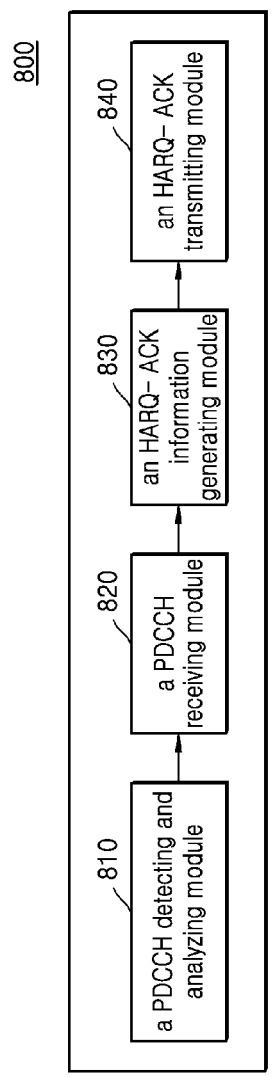
[Fig. 9]
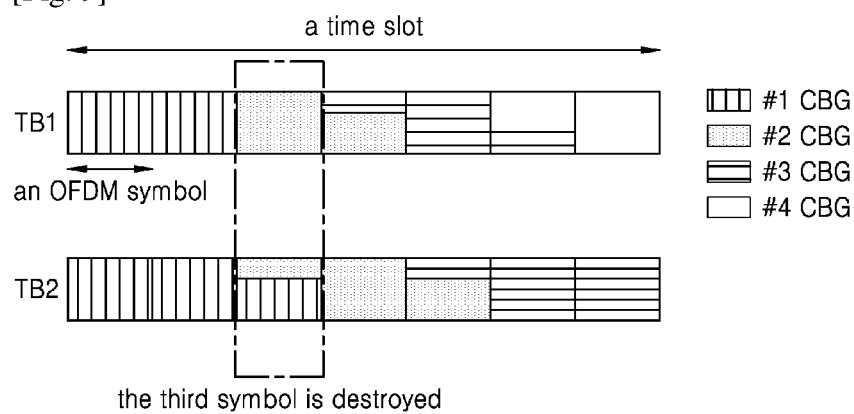
the third symbol is destroyed

[Fig. 10]
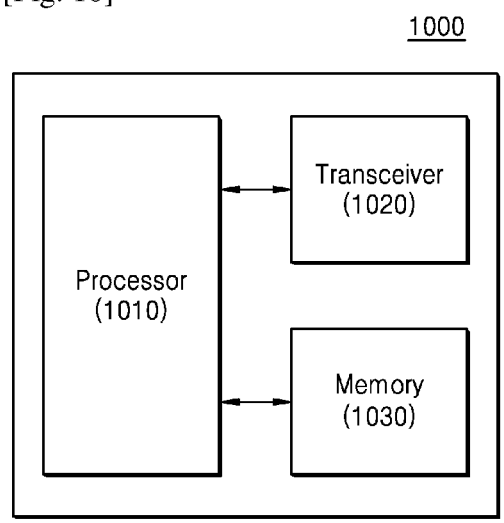

METHOD AND DEVICE FOR TRANSMITTING DATA

TECHNICAL FIELD

The present disclosure relates to wireless communication technology, in particular to a method and a device for enhancing a performance of data transmission while supporting services with requirements of multiple TTI lengths at the same time.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE

Technical Problem

When a plurality of services exist, in order to transmit the second type of service, it may be necessary to punch a part of the time-frequency resources of the first type of service or to transmit the data of the two types of services simultaneously on a part of the time-frequency resources of the first type of service. It may influence a transmission performance of the first type of service. Therefore, how to ensure the performance of the first type of service is an urgent problem to be solved.

Technical Solution

The present application provides a method for transmitting data, which includes the following. A UE detects a physical downlink control channel, PDCCH, on a configured control resource set, analyzes the detected PDCCH, determines a method for dividing code blocks, CBs, and a method for rate matching of a physical downlink shared channel, PDSCH, and receives the PDSCH accordingly.

Advantageous Effects

By the method of the present application, when a service with a low delay requirement punches the time-frequency resources of other services, a performance of the other services is improved as much as possible, and the resource utilization rate is improved as much as possible.

DESCRIPTION OF DRAWINGS

FIG. 1 is a frame structure of a LTE FDD system.

FIG. 2 is a schematic diagram illustrating a process that the second type of service punches the time-frequency resources of the first type of service.

FIG. 3 is a flow chart for explaining a method according to an embodiment of the present disclosure.

FIG. 4 is a schematic diagram illustrating dividing CBG according to a MTU according to an embodiment of the present disclosure.

FIG. 5 is a schematic diagram illustrating a fast HARQ retransmission according to an embodiment of the present disclosure.

FIG. 6 is a first schematic diagram illustrating RE mapping of the PDSCH according to an embodiment of the present disclosure.

FIG. 7 is a second schematic diagram illustrating RE mapping of the PDSCH according to an embodiment of the present disclosure.

FIG. 8 is a diagram illustrating a device according to an embodiment of the present disclosure.

FIG. 9 is a schematic diagram illustrating CB/CBG mapping of the PDSCH of the two TBs according to an embodiment of the present disclosure.

FIG. 10 is a diagram illustrating a device according to another embodiment of the present disclosure.

BEST MODE

The present application provides a method and device for transmitting data, which provides a mechanism for improving performance of data transmission when supporting services with requirements of multiple TTI lengths simultaneously.

To achieve the objective above, the present application adopts the following technical solutions: a method for transmitting data, comprising: detecting, by a user equipment, UE, a physical downlink control channel, PDCCH, on a configured control resource set; determining, by the UE, a method for dividing code blocks, CBs, and a method for rate matching of a physical downlink shared channel, PDSCH, and receiving the PDSCH according to the PDCCH; and generating, by the UE, HARQ-ACK information according to the PDSCH and transmitting the HARQ-ACK information.

Preferably, dividing CBs comprises: for a transmission block, TB, triggering the performance of dividing the CBs of the TB when the TB size, TBS, is greater than a second threshold; wherein the size of each CB is less than a third threshold; and the third threshold is less than or equals to the second threshold; wherein, the second threshold and/or the third threshold is predefined, which is semi-statically configured by a high layer signaling or dynamically indicated in a PDCCH; and/or, when the TBS is less than or equal to the second threshold, the TB contains one CB only.

Preferably, dividing CBs comprises: for a TB, dividing the TB into M CB groups, CBG; and dividing each CBG into one or more CBs; wherein, M is predefined, which is semi-statically configured by a high layer signaling or dynamically indicated in a PDCCH.

Preferably, the TB is equally divided into M CBGs; or modulation symbols of a CBG are mapped to one or more Mini-time units, MTUs, and modulation symbols of different CBGs are mapped to different MTUs; wherein, the number of bits of any CBG is proportional to the number of REs for transmitting data in the MTU which is mapped to the CBG; or the number of bits of any CBG is proportional to the number of orthogonal frequency division multiplexing, OFDM, symbols of the MTU which is mapped to the CBG.

Preferably, for a transmission mode supporting to transmit two TBs at the same time, numbers of CBGs divided by two TBs are equal.

Preferably, for a transmission mode supporting to transmit two TBs at the same time, numbers of CBGs divided by two TBs are not equal.

Preferably, M is determined according to one or more of the following parameters: business type; DCI format; system parameters; downlink control channel resource set; and downlink control channel search space.

Preferably, the HARQ-ACK information is single bit HARQ-ACK information for one TB or multi-bit HARQ-ACK information for one TB, and the HARQ-ACK information is determined to be the single bit HARQ-ACK information or the multi-bit HARQ-ACK information according to one or more of the following parameters: business type; DCI format; system parameters; downlink control channel resource set; and downlink control channel search space.

Preferably, the HARQ-ACK information is single bit HARQ-ACK information for one TB before a multi-bit HARQ-ACK feedback method is configured; or the single bit HARQ-ACK information is fed back for one TB through a DCI in a public search space, CSS; or the single bit HARQ-ACK information is fed back for one TB through a DCI in a fallback mode; or the single bit HARQ-ACK information is fed back for one TB through a DCI in at least one control resource set.

Preferably, for a CBG, one bit is used to indicate whether the CBG is transmitted; a predefined bit value is used to indicate whether the CBG is transmitted, or, a predefined relative bit state is used to indicate whether the CBG is transmitted.

Preferably, the predefined relative bit state is, if the bit is toggled with respect to an initial transmission scheduling the same TB, the CBG is not scheduled, and if the bit is untoggled with respect to the initial transmission scheduling the same TB, the CBG is scheduled.

Preferably, the bit is used to indicate only in a retransmission, for the initial transmission, the bit is not used to indicate whether or not the corresponding CB/CBG is scheduled.

Preferably, when all of the bits in the DCI are toggled with respect to all of the bits in the DCI of the initial transmission scheduling the previous TB, and values of all of the bits are equal, then a new initial transmission is indicated.

Preferably, when the bits corresponding to all the scheduled CBGs in the DCI are all toggled with respect to the bits corresponding to all the scheduled CBGs in the DCI of the initial transmission scheduling the previous TB, and values of all the bits are equal, a new initial transmission is indicated.

Preferably, if and only if the bits of all CBGs are toggled with respect to the initial transmission of the previous TB scheduling the same HARQ process, an initial transmission of a new TB is indicated, otherwise a retransmission.

Preferably, or a combination of a group of the control parameters is used to indicate whether the CBG is transmitted;

Preferably, the number of CBGs scheduled currently is indicated by N bits.

Preferably, if at least one retransmitted CBG is scheduled in a DCI, the size of the retransmitted CBG determined by the DCI is the same as the size of the CBG determined by the DCI scheduling the same CBG in the last time; or if at least one retransmitted CBG is scheduled in a DCI, the size of the TB indicated by the DCI is the same as the size of the TB indicated by the DCI scheduling the same CBG in the last time.

Preferably, decoding, by the UE, the PDSCH according to retransmitted CB, CBG and OFDM symbols, when the PDCCH is used to schedule to retransmit a part of CB, CBG or OFDM symbols for the TB, and UE considers that the retransmissions of the CB, CBG or OFDM symbols are affected; or decoding, by the UE, the PDSCH according to the indication of the PDCCH that whether the retransmissions of the CB, CBG or OFDM symbols are affected; or decoding, by the UE, the PDSCH according to the indication of the PDCCH that whether to perform a HARQ combination on the retransmissions of the CB, CBG or OFDM symbols.

Preferably, receiving the PDSCH comprises: receiving the retransmissions of CB, CBG or OFDM symbols which are affected in a fast retransmission time window; or receiving the entire retransmitted TB in a fast retransmission time window.

Preferably, determining, by the UE, the TB is affected, when the retransmission of the same TB is received within the fast retransmission time window; otherwise, determining, by the UE, the TB is not affected; or determining, by the UE, whether the current retransmitted CB, CBG, OFDM symbols or the entire TB are affected according to the indication in the PDCCH.

Preferably, defining a reference processing capability of the UE according to reference values of a set of system parameters; determining the processing capability of the UE in an actual working scenario according to the reference processing capability of the UE, when the system parameters of the UE in the actual working scenario are different from the reference values.

Preferably, determining the processing capability of the UE in the actual working scenario according to the reference processing capability of the UE comprises: determining the processing capability of the UE in the actual working scenario according to the reference processing capability of the UE and the changing factors of the processing ability of the UE; wherein, a reference TTI is Tref, the length of the actual TTI of the UE is T, and the changing factors of the processing capability of the UE is $T/T_{ref}$; or determining the processing capability of the UE in the actual working scenario equaling to the reference processing capability of the UE.

Preferably, the rate matching of the PDSCH comprises: for a type of service, performing the rate matching of the PDSCH according to a control resource set of the type of service and a time-frequency resource set which cannot be used to transmit the PDSCH of the type of service; or for a type of service, performing the rate matching of the PDSCH according to a control resource set of the type of service, a time-frequency resource set which cannot be used to transmit the PDSCH of the type of service, a control resource set of another type of service and a time-frequency resource set which cannot be used to transmit the PDSCH of another type of service.

A device for transmitting data, the device comprising: a transceiver; at least one memory storing instructions; at least one processor configured to execute the stored instructions to: detect a PDCCH on a configured control resource set, determine a method for dividing CBs and a method for rate matching of a PDSCH according to the PDCCH, control the transceiver to receive the PDSCH according to the PDCCH, generate HARQ-ACK information according to the PDSCH and control the transceiver to transmit the HARQ-ACK information.

By the method of the present application, when a service with a low delay requirement punches the time-frequency resources of other services, a performance of the other services is improved as much as possible, and the resource utilization rate is improved as much as possible.

MODE FOR INVENTION

In order to make the purpose, the technical scheme and advantages of the present disclosure more clearly, the present disclosure is further described in detail with reference to the accompanying embodiments and drawings.

FIG. 1 is a frame structure of a LTE FDD system.

In a wireless communication system, downlink transmission refers to transmitting a signal from a base station to a UE (user equipment). A downlink signal includes a data signal, a control signal, and a reference signal (pilot). Here, the base station transmits downlink data in a physical downlink shared channel (PDSCH), or transmits downlink control information in a downlink control channel. Uplink transmission refers to transmitting a signal from the UE to the base station. An uplink signal also includes a data signal, a control signal and a reference signal. Here, the UE transmits uplink data in a physical uplink shared channel (PUSCH), or transmits uplink control information in a physical uplink control channel (PUCCH). The base station may dynamically schedule the PDSCH transmission and PUSCH transmission of the UE through a physical downlink control channel (PDCCH).

In the 3GPP LTE system, the downlink transmission technology is Orthogonal Frequency Division Multiple Access (OFDMA), the uplink transmission technology is Single Carrier Frequency Division Multiple Access (SCFDMA). As shown in FIG. 1, a length of each radio frame is 10 ms, which is divided into 10 subframes. A time interval (TTI) of the downlink transmission is defined on a subframe. Each downlink subframe includes two time slots, for a general length of a CP, each time slot comprises seven OFDM symbols. A granularity of the resource allocation is a PRB (physical resource block), and the PRB contains 12 consecutive subcarriers in frequency, corresponding to a time slot in time. A resource unit (RE) is the smallest unit of time-frequency resources, that is, a subcarrier in frequency field and an OFDM symbol in time field.

The 3GPP standard organization is standardizing a new access network technology (NR), the NR is still an OFDM-based system. For data transmission, TTI lengths suitable for different services are different depending on requirements of throughput and delay. For some services, such as a service pursuing greater throughput, including an eMBB service, the TTI length may be relatively large, which will reduce cost of a control signaling, hereinafter referred to as a first type of service, and a time period mapped by the longer TTI is called a time unit (TU), for example, a slot. For other services, such as those with higher requirements of delay, including a URLLC service, the TTI length needs to be small relatively, thereby the delay of processing is reduced, hereinafter referred to as a second type of service, and a time period mapped by the shorter TTI is called a mini-time unit (MTU), for example, a min-slot. An MTU contains one or more OFDM symbols. A TU may be divided into multiple MTUs, a number of symbols for each MTU can be the same or different. An MTU can be a part of a TU, or an MTU may span a boundary of two adjacent TUs.

FIG. 2 is a schematic diagram illustrating a process that the second type of service punches the time-frequency resources of the first type of service.

Taking the downlink data transmission as an example, assuming that the first type of service has been scheduled within a TU, but when the second type of service is generated, in order to reduce the delay as much as possible, the base station needs to transmit the second type of service on a MTU within the TU. If time-frequency resources have been assigned to the first type of service, the second type of service may occupy, a part of the time-frequency resources having been assigned to the first type of service, to transmit. Only data of the second type of service may be transmitted on overlapping time-frequency resources of the two types of services. As shown in FIG. 2, it is assumed that a TU is divided into two MTUs: MTU 201 and MTU 202. Assuming that time-frequency resource 211 has been scheduled for the first type of service on the TU but a new second type of service is generated before MTU 202 and requires to be processed quickly. The base station may schedule time-frequency resources 212 for the second type of service in MTU 202. Depending on the scheduling of the base station, for example, when there is not enough time-frequency resources in the MTU 202, part or all of the time-frequency resources 212 may overlap with the time-frequency resources 211. At this time, on the overlapping time-frequency resources of the two types of services, only the second type of service is transmitted. Alternatively, the two types of services may be transmitted on the overlapping time-frequency resources of the two types of services at the same time. For the latter method, it is possible to distinguish the two types of services by setting different transmission powers, so that the UE can receive the data transmission scheduled to it correctly. According to the discussion above, in order to transmit the second type of service, it may be necessary to punch a part of the time-frequency resources of the first type of service or to transmit the data of the two types of services simultaneously on a part of the time-frequency resources of the first type of service, which may influence a transmission performance of the first type of service. How to ensure the performance of the first type of service is an urgent problem to be solved.

FIG. 3 is a flow chart for explaining a method according to an embodiment of the present disclosure.

Step 301: A UE detects a PDCCH on a configured control resource set.

In a downlink TU or MTU, the base station may configure Q control resource sets for the UE, and Q is greater than or equal to 1. For a control resource set, it corresponds to one or more OFDM symbols in time, and corresponds to one or more PRBs in frequency. A PDCCH is mapped to a control resource set. The UE detects the PDCCH on the control resource set configured by the base station.

Step 302: The UE analyzes the detected PDCCH, determines a method for dividing code blocks (CBs) and a method for PDSCH RE mapping, and receives the PDSCH accordingly.

According to the characteristics of the service, as for some services, such as services pursuing a greater throughput, including an eMBB service, the TTI length may be relatively large, which is conductive to reduce cost of a control signaling, hereinafter referred to as a first type of service. For example, a TB of the first type of service may be mapped to a TU to transmit. For other services, such as those with higher requirements of delay, including an URLLC service, adopting a shorter TTI, hereinafter referred to as a second type of service. For example, a TB of the second type of service may be mapped to an MTU to transmit.

The UE may determine a TBS and divide CBs and/or CB groups (CBG) accordingly, depending on a DCI carried by the received PDCCH, so that the data channel may be decoded and the like. Here, a TB may be divided into multiple CBs firstly and then the multiple CBs are grouped into several CBGs; alternatively, the TB may be divided into multiple CBGs firstly, and each CBG may be further divided into one or more CBs. In particular, when data is retransmitted, the base station may retransmit the entire TB, or may only retransmit a portion of the CB or CBG of the current TB or a portion of modulation symbols on the OFDM symbols. Accordingly, the UE may perform a HARQ combination to receive data after receiving the DCI; or the UE may also overwrite associated soft bits in a soft buffer with the received retransmitted soft bits.

Step 303: The UE generates HARQ-ACK information based on the received PDSCH and transmits the HARQ-ACK information.

The method for processing the data transmission according to the present disclosure is illustrated in the following embodiments.

Embodiment One

For the second type of service, in order to minimize the delay, part of the time-frequency resources that have been used for the first type of service may be occupied, which causes a interference to the first type of service. For example, in FIG. 2, the first type of service occupies the entire TU for transmission, but part of time-frequency resources of its second MTU are subject to the interference of the second type of service. When the TB of the first type of service only contains one CB, the CB may be affected by the second type of service surely, which may cause the reception of TB to fail, and it causes the base station to have to retransmit the whole TB. When the TB of the first type of service is actually divided into multiple CBs to transmit, it is possible that the interference from the second type of service is mainly concentrated on a part of the CBs. On the UE side, the CBs that are not subject to the interference are likely to receive correctly, and CBs that are subject to interference may be in error. In particular, when the transmission of the second type of service causes to punch the overlapping time-frequency resources of the first type of service, the possibility, that the CBs of the affected first type of service may not be decoded correctly, is great. In FIG. 2, it is assumed that the TB of the first type of service is divided into two CBs, so that the two CBs are basically mapped to the first half and the second half of the TU to transmit, which is consistent with the division of the MTU. In this way, because the MTU 202 transmits the second type of service, the second CB is affected, so it is likely to be wrong or it is in error surely, and the first CB may still transmit successfully with great probability. Therefore, the base station may only need to retransmit the second CB, thus the downlink resources is saved.

Assuming that the effect of the second type of service is not taken into account, it is necessary to increase a size of the CB as much as possible from the viewpoint of reducing the overhead of the CRC of the CB and increasing a channel coding gain. Therefore, when the TBS is greater than a first threshold K1, the operation of dividing the TB into multiple CBs is triggered and the size of any CB is not exceeded K1. When the TBS is less than or equal to K1, TB contains one CB only. The reference threshold K1 may be pre-defined, or configured by a high layer signaling semi-statically, for example, K1 equals to 6144 in the LTE system. According to the analysis above, by dividing the TB into multiple CBs, the impact of the second type of service on the TB transmission of the first type of service is reduced. However, when the TB size (TBS) is relatively small, dividing too many CBs will have a negative impact. On the one hand, since each CB needs to add a CRC separately, so as to determine whether or not each CB is received correctly, which leads to some overhead; on the other hand, when the size of the CB decreases, the channel coding gain is reduced too, which is not conducive to improving a performance of the link. Therefore, the present disclosure proposes that when the TBS is greater than a second threshold K2, the operation of dividing the TB into multiple CBs is triggered and the size of any CB is not exceeded the third threshold K3; when TBS is less than or equal to K2, TB only contains one CB. K3 may be equal to K2, so it may be set by using the same parameter. Or, K3 may be less than K2, then, once needing to divide out the CBs, it is possible to divide out more CBs. K2 is less than or equal to K1. The K2 and/r K3 above may be predefined, configured by the high layer signaling semi-statically, or indicated in the PDCCH dynamically.

When K2 is less than K1, on the one hand, when the TB is particularly small, that is, when the TBS is less than or equal to K2, no dividing the CBs, reduces the overhead of CRC and guarantees the channel coding gain; on the other hand, in order to consider the possible influence of the second type of service, the TBS does not need to exceed K1, as long as more than K2, the dividing of the CBs is triggered, so that the second type of service may only affect part of the CBs of the TB, which may improve the resource utilization. The values of K2 and/or K3 may also be related to the TBS. For example, when the TBS is less than or equal to $c \cdot K_1$, the value of K2 is $K_{2,1}$; otherwise, the value of K2 is $K_{2,2}$, $K_{2,1} < K_{2,2} \leq K_1$. c is a predefined constant, or a value configured by the high layer signaling semi-statically. $K_{2,1}$ and/or $K_{2,2}$ may be pre-defined, configured by the high layer signaling semi-statically. When the TBS is not greater than $c \cdot K_1$, K2 is set to be smaller $K_{2,1}$ to increase the number of the dividing CBs; when the TBS is larger, K2 is increased to be $K_{2,2}$ to increase the size of the CBs, thus ensuring that TB may be divided into enough CBs still, the channel coding gain is increased at the same time.

By the method above, the number of the CBs divided by the TB is increased, the impact of the overlapping time-frequency resources occupied by the second type of service may be reduced. However, since the operation of dividing the CBs is not directly related to the structure of dividing the MTUs, the time-frequency resources mapped by one CB may span two adjacent MTUs still. When there is only one MTU used for the second type of service, although only part of the modulation symbols of the CBs are affected by the second type of service, it may still lead to the CBs cannot be received properly.

The present disclosure proposes that the TB can be divided into M CBGs, each CBG comprises one or more CBs. One method to divide the TB into CBGs is to divide the TB into M1 CBs first, and a number of bits of each CB may be as equal as possible. For example the method of determining a total number of the CBs and the number of bits of each CB according to the TB size and the maximum number 6144 of bits of CB in the LTE system; then, M1 CBs are mapped to M CBGs, wherein M1>=M. For example, if a TB contains only 2 CBs, the number of CBGs must be less than or equal to 2. When M1>M, a number of CBs within each CBG is determined according to the principle that the M1 CBs are distributed to M CBGs evenly as far as possible. When M can not be divided by M1, the number of the CBs in each CBG is not equal exactly. Alternatively, the other method of dividing the TB into the CBGs may be that the TB is divided into M small blocks first, each of which is divided into one or more CBs further, that is one of the small blocks corresponds to a CB group (CBG), each CBG contains one or more CBs, M is the number of the CBG.

Dividing the TB into M CBGs, of which the M may be pre-defined, configured by the high layer signaling semi-statically, or indicated in PDCCH dynamically. M may be less than or equal to the number of the MTUs within one TU.

When M is indicated in the PDCCH dynamically, a length of a bit field for indicating M CBGs in the PDCCH is pre-defined by the standard or configured by the high layer signaling. For example, the maximum value of M configured by the highlayer signaling is Mmax, and the length of the bit field is determined according to Mmax. In an implementation method, the length of the bit field is Mmax, a number of CBGs divided by a TB is indicated by a bit-map maner, or the number of CBGs scheduled actually is indicated at the time of scheduling retransmission by bit mapping. In another implementation method, the length of the bit field is Mconf, different bit states of these bits, indicates that this is a TB level transmission that is all CBGs of a TB are transmitted, and indicates the total number of CBGs, or indicates that this is a CBG?level transmission respectively, and the transmitted CBG is a CBG corresponding to a NACK in HARQ-ACK feedback information of the CBG-level of the UE. For example, the length of the bit field is Mconf=2, and its four bit states "00", "01", "10", indicate that this is a TB-level transmission and that the total number of the CBGs of the TB is 2, 4 and 8, "11" indicates that this is a CBG-level transmission, and the transmitted CBG is a CBG corresponding to a NACK in HARQ-ACK feedback information of the CBG-level of the UE. Since the total number of the CBGs that a TB may be divided only needs to be in the initial transmission or when an error occurs in the base station, for example, when errors are detected in the HARQ-ACK feedback information, the base station may notify the UE when scheduling the transmission of the entire TB, and in other cases, the UE may determine the CBG information retransmitted by the base station based on the NACK of its own feedback. Therefore, the 2 bits in the example above do not need to indicate indication information of the CBG at the CBG-level scheduling.

In order to control the CRC overhead of the CB and to ensure the channel coding gain, the method of dividing the TB into M CBGs may be performed, only when the TBS is greater than a fourth threshold K4. K4 may be pre-defined, configured by the high layer signaling semi-statically, or indicated in the PDCCH dynamically.

The TB may be divided into M CBGs equally, that is, the number of bits of each CBG is equal to $\lfloor TBS/M \rfloor$ or $\lceil TBS/M \rceil$; or, the number of bits of each CBG is equal to $\lfloor TBS/M \rfloor$ or $\lceil TBS/M \rceil$ approximately, but the number of bits of a CBG may be adjusted according to other criteria.

For M CBGs divided by one TB, modulation symbols of a CBG may be mapped to one MTU or multiple MTUs only, and the modulation symbols of different CBGs may be mapped to different MTUs. As shown in FIG. 4, it is assumed that a TU is divided into two MTUs: MTU 401 and MTU 402. Assuming that the time-frequency resources 411 and 412 have been scheduled for the first type of service on the TU, the time-frequency resource 411 is on the MTU 401, and the time-frequency resource 412 is on the MTU 402. Here, it is assumed that TBs of the first type of service are divided into two CBGs and mapped to time-frequency resources 411 and 412 respectively. A new second type of service is generated prior to the MTU 402 and needed to be processed quickly, the base station may schedule the time-frequency resource 421 for the second type of service on the MTU 402. Depending on the scheduling of the base station, for example, some or all of the time-frequency resources 421 may overlap with the time-frequency resources 412 when there is not enough time-frequency resources in the MTU 402. Because the first CBG is only mapped to the time-frequency resource 411, the first CBG is not affected by the second type of service, so the CBs of the first CBG may still be transmitted successfully with a relatively large probability.

A number of bits of each CBG may be proportional to a number of REs used for transmitting data of the MTU which is mapped to the CBG. For example, it is assumed that one TU is divided into two MTUs, and a TB is divided into two CBGs. A total number of the REs used to transmit data of the PDSCH in the TU is recorded as N, wherein, and the number of the REs used for transmitting data in the first MTU of the PDSCH is N1, then a number of bits assign for the first CBG is $\lfloor TBS \cdot N_1/N \rfloor$ approximately. Alternatively, the number of bits of each CBG may be proportional to a number of the OFDM symbols of the MTU which is mapped to the CBG. For example, it is assumed that one TU is divided into two MTUs, a TB is divided into two CBGs, the number of OFDM symbols in the TU is recorded as S, wherein, a number of OFDM symbols in the first MTU is S1, then the number of bits assigned to the first CBG is $\lfloor TBS \cdot S_1/S \rfloor$ approximately. Adopting this approach, because the number of the REs that cannot be used for data transmission within each MTU may be different, the coding rates of the two CBGs may not be the same. If the number of OFDM symbols of the MTU may be variable, that is, the number of MTUs in one TU is variable and a position of the MTU in the TU is also variable, it may appear that one CBG bit is mapped to two adjacent MTUs. However, adopting the method of dividing the TB into M CBGs still ensures that one CBG is mapped to an entire OFDM symbol, which is conductive to reduce the impact of the second type of service.

For a transmission mode supporting to transmit two TBs simultaneously, such as a MIMO transmission, multiple layers are transmitted on the same time-frequency resources in parallel, and two TBs are carried, because signal-noise ratios at different layers are different generally and the TBSs of the two corresponding TBs are generally different. Because of the difference between the TBSs, if the same maximum of the size of the CB is used while dividing the CBs, the number of the CBs divided by the two TBs is different. At this time, influences of the transmission of the second type of service on the two TBs are different. For example, assuming that the first TB is larger and divided into two CBs; the second TB is smaller and is handled as one CB only. The second type of service may affect a CB of the first TB only, but the entire second TB is affected. For the downlink transmission, the base station may need to transmit the affected CBs of the first TB and the entire second TB, which adds PDCCH overhead indicating data transmission. Based on the method of dividing M CBGs of the TB, although the TBSs of the two TBs may be different, the number of CBGs divided by the two TBs is always guaranteed or ensured to be equal as much as possible, so that a consistent method may be used to process the data retransmission.

In different cases, the number of CBGs M divided by a TB may be determined separately, that is, values of M in different situations may be the same or different. Wherein, M=1, which is a special case, that is, being the same as the LTE system, a TB is not divided into the CBGs, and the TB is considered as one CBG. The different cases may refer to different types of services. For example, the TBs of the first type of service and the second type of service adopt different values of M. The difference cases may refer to differences between the DCI formats, that is, the values of M used by the TBs scheduled by different DCI formats are different. For example, scheduling different service types may adopt different DCI formats, so that the value of M may be determined according to the DCI format. Or combining with public/user-specified search space of a cell, the value of M is determined. The different cases may refer to differences between multiple downlink control channel resource sets, that is, M values used by the TBs transmitted under different downlink control channel resource sets are different. The different cases may refer to differences between system parameters (Numerology), that is, the values of M used by the TBs transmitted under different system parameters are different. The system parameters may refer to a subcarrier spacing (SCS) and/or a TTI length, for example, the TTI length may be determined by whether the TB is mapped to a TU or a MTU or the like. For example, data of different types of service may be transmitted by adopting different system parameters, so that the value of M may be determined according to the system parameters. In fact, it is also possible to determine the value of M based on multiple combinations of the parameters above. The value of M in the different cases may be predefined, or may also be determined through the configuration of the high layer signaling. The method of dividing a TB into multiple CBGs may be applied on all TUs and/or MTUs; alternatively, the method above may also be applied to only a part of TUs and/or MTUs. The part of TUs and/or MTUs may be predefined and configured by the high layer signaling semi-statically.

For a data transmission based on the HARQ, the UE may feed back N bits for one TB, and N is greater than 1. Correspondingly, after receiving HARQ-ACK information of each CBG, the base station may only retransmit CBGs received by the UE incorrectly still, so that utilization of the downlink resources is improved. For example, the method for dividing the TBs into M CBGs may be adopted, correspondingly, the UE may feed back the HARQ-ACK information for each CBG separately. The present disclosure does not limit the other methods to generate multi-bit HARQ-ACK information for one TB. Hereinafter referred to as a multi-bit HARQ-ACK feedback method. Another HARQ-ACK feedback method is to feed back single bit HARQ-ACK information for one TB only, that is, a single bit HARQ-ACK feedback method. In different cases, the methods of feeding back HARQ-ACK information for one TB may be different. As mentioned above, the methods of feeding back HARQ-ACK information may be configured according to different service types, or DCI format and/or public/user-specified search space of the cell, or the downlink control channel resource set, or system parameters.

Before the multi-bit HARQ-ACK feedback method is not configured, the UE may consider that the single bit HARQ-ACK feedback method is adopted on all scheduled TUs and/or MTUs, that is, it is a default operation to feed back single bit HARQ-ACK information for one TB. The multi-bit HARQ-ACK feedback method described may be used for all scheduled TUs and/or MTUs; alternatively, HARQ-ACK information feedback methods adopted on different TUs and/or MTUs may be different. That is, the multi-bit HARQ-ACK feedback method is adopted on a part of TUs and/or MTUs, and the single bit HARQ-ACK feedback method is adopted on the other part of TUs and/or MTUs.

When configuring/reconfiguring the multi-bit HARQ-ACK feedback method, in order to solve the possible confusion of the current HARQ-ACK feedback method by the base station and the UE, following methods may be adopted. A first method is to define some type of DCIs adopting the single bit HARQ-ACK feedback method fixedly. For example, the DCIs in a common search space (CSS) adopting the single bit HARQ-ACK feedback method or the HARQ-ACK feedback method of the DCI in a USS is configured by the higher-layer signaling. In particular, the single bit HARQ-ACK feedback method is adopted by the DCI in the common search space (CSS) fixedly while the multi-bit HARQ-ACK feedback method is adopted by the DCI in a user-specific search space (USS) fixedly.

In general, the base station may configure the UE to adopt two transmission modes at the same time, one of which is a normal transmission mode which may be used to make full use of channel conditions and capabilities of the UE to improve the performance of the downlink transmission; the other is a DCI for a fallback mode, which is used to improve the reception reliability of the DCI and data transmission generally. In this way, a second method is only supporting the single bit HARQ-ACK feedback method for the fallback DCI, and the HARQ-ACK feedback method for the normal DCI is configured by the higher-layer signaling. In particular, the single bit HARQ-ACK feedback method may be adopted by the fallback DCI fixedly and the multi-bit HARQ-ACK feedback method is adopted by the HARQ-ACK feedback of the DCI of the normal transmission mode fixedly, if higher-layer configures multi-bit HARQ-ACK feedback method.

In addition, the base station may configure the UE to detect the PDCCH on a plurality of control resource sets. The different control resource sets may adopt different methods to transmit the PDCCH, for example, partial transmission and distributed transmission, configuring the multiple control resource sets is conducive to improve a flexibility of multiplexing the PDCCH of any UE and to ensure the performance of transmission of the PDCCH of any UE. A third method is that on the multiple control resource sets, the DCIs of at least control resource set adopt the single bit HARQ-ACK feedback method fixedly, while the HARQ-ACK feedback methods of the DCIs of the other control resource sets are configured through the high layer signaling. In particular, the DCIs of at least one control resource set adopt the single bit HARQ-ACK feedback method fixedly, while the DCIs of the other control resource sets adopt the multi-bit HARQ-ACK feedback method fixedly.

Embodiment Two

For the downlink data transmission, it is assumed that one transmission of a TB of the first type of service partially overlaps with the time-frequency resources of the second type of service, for example, if the base station only transmits the data of the second type of service on the overlapping time-frequency resources, when retransmitting the first type of service, the base station may only retransmit the data of the first type of service carried on the time-frequency resources affected by the second type of service of the TB, for example, only retransmitting the affected CBs, CBGs or retransmitting the entire TB; or, only retransmitting the data of the affected time-frequency resources may refer to only retransmitting the data on the affected PRBs and/or the OFDM symbols or only retransmitting the data on the affected MTUs.

The affected CBs, CBGs or time-frequency resources in the retransmission may be indicated implicitly. For example, assuming that the DCI schedules a retransmission for a part of the CBs or CBGs, or the DCI schedules a retransmission of data of a part of the time-frequency resources in the previous transmission, then the UE may consider that the affected CBs, CBGs, or the data on the affected time-frequency resources are retransmitted. For the case of scheduling a retransmission of a entire TB, it is necessary to indicate whether the TB is affected by the second type of service in the DCI or to indicate whether the UE may perform a HARQ combining and a decoding for the TB, or may not perform the HARQ combining and only perform the decoding according to the retransmitted TB. Assuming that the DCI scheduling the retransmission indicates the affected CBs or CBGs, the UE may clear buffered soft bits corresponding to the affected CBs or CBGs, and may decode according to the received soft bit information of the retransmission of the CBs or CBGs, so as to determine whether or not the TB, CBs and/or CBGs are received successfully. Alternatively, assuming that the DCI scheduling the retransmission indicates that the TB is affected by the second type of service, the UE may clear the buffered soft bits of the TB and decode according to the received soft bit information of the retransmission of the TB, so as to determine whether or not the TB is received successfully. Alternatively, assuming that the DCI scheduling the retransmission indicates the affected time-frequency resources, the UE may clear the buffered soft bits having been buttered of the corresponding affected time-frequency resources, and may decode according to the received soft bit information of the retransmission of the corresponding affected time-frequency resources, so as to determine whether or not the TB, CBs and/or CBGs are received successfully.

When retransmitting, whether or not the retransmitted TB, CBs, CBGs or the data on the time-frequency resources currently are affected by the second type of service may be indicated in the DCI. When retransmitting a CB or CBG of the TB, the base station may further indicate whether or not the retransmitted CB or CBG currently is affected by the second type of service in the previous transmissions in the DCI. Assuming that according to the received DCI, as for the CBs or CBGs affected by the second type of service, the UE may flush the buffered soft bits corresponding to the CBs or CBGs, and may decode based on the received soft bit information of the retransmission of the CBs or CBGs; For CBs or CBGs that is not affected by the second type of service, the UE performs HARQ combining on the soft bits of the CBs or CBGs, and then performs decoding. Alternatively, when retransmitting a TB, the base station may further indicated whether or not the retransmitted TB currently is affected by the second type of service in the previous transmission, in the DCI. Assuming that according to the received DCI, as for the TB affected by the second type of service, the UE may flush the buffered soft bits of the TB and may perform decoding according to the received soft bit information of the retransmission of the TB; As for a TB unaffected by the second type of service, the UE performs HARQ combining on the soft bits of the TB and then performs decoding. Alternatively, the base station may indicate, in the DCI, data of which time-frequency resources is retransmitted currently in the preceding transmission or and may indicate further in the DCI whether or not the retransmitted data currently of the time-frequency resources is affected by the second type of service. According to the received DCI, as for the time-frequency resources affected by the second type of service, the UE may flush the buffered soft bits corresponding to the affected time-frequency resources and may perform decoding according to the received the soft bit information of the retransmission of the affected time-frequency resources; as for time-frequency resources not affected by the second type of service, the UE performs HARQ combining on the soft bits of the time-frequency resources and then performs decoding.

When retransmitting, the operations adopted on the retransmitted TB, CB, CBG or data of the time-frequency resources may be instructed to the UE in the DCI directly. That is, the UE is instructed to perform the HARQ combining and decoding on the data of the TB, the CBs, the CBGs or the time-frequency resources, or the UE is instructed not to perform the HARQ combining, but to perform decoding according to the retransmitted TB, the CBs, the CBGs or data of the time-frequency resources. Specifically, no HARQ combining means that, if data of a part of the CBs, the CBGs or data of a part of time-frequency resources in the previous transmission, is retransmitted, the UE may flush the buffered soft bits corresponding to the part of CBs, CBGs or time-frequency resources, and may perform decoding according to the soft bit information of of the retransmission of the part of CBs, CBGs or time-frequency resources; if the entire TB is retransmitted, the UE may flush the buffered soft bits of the TB and may perform decoding according to the received soft bit information retransmitted by the TB.

Assuming that the UE still feeds back HARQ-ACK information to a TB, as for the one transmission of the TB of the first type of service, CBs or CBGs are likely to go wrong due to the influence of the second type of service, which causes the UE to feed back a NACK to the TB. In this case, the HARQ-ACK feedback information does not have much reference value to the base station, the base station may indicate and retransmit the affected CBs or CBGs according to the method above. After the UE receives part of the affected CBs or CBGs again and decodes them, the HARQ-ACK information of the TB fed back by the UE reflects whether or not the current TB is transmitted successfully. If the UE feeds back an ACK, it represents the TB has received correctly. If the UE feeds back a NACK, it may be caused by a burst error or an improper link adaptation, the base station may retransmit the TB according to the HARQ-ACK information and adjust the data transmission parameters for the UE accordingly.

Or, it is assumed that the HARQ-ACK feedback of the UE is enhanced so that the UE feeds back the multi-bit HARQ-ACK information for a TB, for example, feeding back the HARQ-ACK information for different CBs or CBGs respectively. At this moment, the CBs or CBGs affected by the second type of service may not be received correctly or may not be received correctly at all with a relatively large probability. The HARQ-ACK information fed back by the UE is a NACK generally, and the base station may indicate and retransmit the affected CBs or CBGs according to the method above. For the CBs or CBGs that is not affected by the second type of service, the HARQ-ACK information fed back by the UE indicates whether or not the CBs or the CBGs are received successfully, so as to assist the retransmission of the base station.

Assuming that in TU n, a transmission of the second type of service affects a transmission of the first type of service, the base station may do a retransmission of the affected CBs, CBGs or data of the affected time-frequency resources, or may do a retransmission of the entire TB in a fast retransmission time window, for example, [n+1, n+g]. The retransmission may adopt the same HARQ process ID as the previous transmission of the TB. A value of the parameter g may make the base station retransmit the affected CBs, CBGs, the affected data of the time-frequency resources or the entire TB before the UE feeds back the HARQ-ACK information; alternatively, the base station is to retransmit the affected CBs, CBGs, the data of the affected time-frequency resources or the entire TB before receiving the HARQ-ACK information fed back by the UE; or recording around trip time delay (RTT) of the current HARQ is r, then g is smaller than r, that is, the base station may retransmit the affected CBs, CBGs, the data of the affected time-frequency resources or the entire TB before the timing at which a base station, limited by the RTT, can retransmit the TB. The UE may feed back the HARQ-ACK information of the PDSCH of TU n and the HARQ-ACK information of the retransmission within the fast retransmission time window respectively. Or, the UE may only feed back the HARQ-ACK information of the retransmission within the fast retransmission time window. The UE may determine whether or not the first type of service is affected by the second type of service according to whether or not a retransmission of a TB is received within the fast retransmission time window. Specifically, if the UE receives a retransmission of the same TB within the fast retransmission time window, the UE may consider the TB of the first type of service is affected by the second type of service, so that the UE may flush the buffered soft bits corresponding to the affected CBs, CBGs, the affected time-frequency resources or the entire TB, and may decoded according to received soft bit information of the retransmission of the affected CBs, CBGs, the affected time-frequency resources or the entire TB correspondingly, so that whether or not the TB, CBs and/or CBGs are received successfully is determined. In addition, if the UE receives a retransmission of the same TB outside the fast retransmission time window, the UE may consider that the TB of the first type of service is not affected by the second type of service, and the UE may perform HARQ combining and decoding. Alternatively, no matter a retransmission is performed within the fast retransmission time window or outside the fast retransmission time window, whether or not the retransmitted CBs, CBGs, the data of the time-frequency resources or the entire TB currently, is affected by the second type of service may be indicated in the DCI scheduling the retransmission.

As shown in FIG. 5, assuming that the base station schedules a TB of the first type of service on the downlink TU 501, the UE may feed back the HARQ-ACK information on the uplink TU 521, so that the base station may retransmit the TB on the downlink TU 502 without causing any confusion of the HARQ process ID. Assuming that the second type of service generates an interference to the transmission of the first type of service on the downlink TU 501, the base station may determine or may almost determine that the TB may not be transmitted successfully. When the TB is divided into multiple CBs or CBGs, the CBs or CBGs interfered by the second type of service are likely to be wrong or certainly to be wrong, the other CBs or CBGs may be transmitted successfully with a relatively large probability. At this time, the base station may retransmit the TB in a fast retransmission window, it is assumed that the base station may retransmit the TB in the downlink TU 511 or may only retransmit the the affected CBs, CBGs, or the data of the affected time-frequency resources in FIG. 5.

Corresponding to the retransmission on the downlink TU 511, the UE feeds back HARQ-ACK information on the uplink TU 522, based on the HARQ-ACK information, the base station may determine that the TB may need to be retransmitted continuously or a new TB may be retransmitted on the downlink TU 512.

Embodiment Three

For a system supporting a variable subcarrier spacing (SCS) and/or a variable TTI length, for example, a 3GPP NR system, the SCS and the TTI length in an actual working scenario of the UE are not fixed according to an actual network configuration. Accordingly, depending on the SCS and the TTI length in the actual work scenario, a processing capability of the UE within a TTI also varies depending on a requirement of the current processing time, including a demodulated maximum TBS and a total number of the TBS of multiple TBs that can be demodulated and so on.

When defining UE categories, a reference processing capability of the UE may be defined according to reference values of a set of system parameters, including a number of soft buffered bits, a maximum TBS that may be demodulated within a TTI, and a sum of the TBS of multiple TBs that may be demodulated within a TTI, and so on. The system parameters used to define the reference processing capability of the UE may include a SCS, a TTI length, a bandwidth and/or processing delay requirements, and the like. For example, the reference value of the system parameters may be 15 kHz for the SCS and 1 ms for the TTI length. When the SCS and/or the TTI length in the actual work scenario of the UE are different from the reference value, the processing capability in the current actual working scenario of the UE is obtained according to the reference processing capability of the UE. A changing factor of the processing ability of the UE may be equal to a metric calculated from the actual value of the system parameters divided by a metric calculated from the reference value of the system parameters. For example, recording that the reference TTI length is Tref and the length of the actual TTI of the UE is T, then the changing factor of the processing ability of the UE may be $T/T_{ref}$, recording that the maximum TBS that may be demodulated by the UE in the reference TTI is $TBS_{max}$, the maximum TBS that may be demodulated by the UE in the actual working scenario is $\lfloor TBS_{max} \cdot T/T_{ref} \rfloor$. Alternatively, when the SCS and/or the TTI length in the actual work scenario of the UE are different from the reference value, the processing capability of the UE in the current actual working scenario may still be considered to equal to the reference processing capability of the UE. For example, assuming that the reference processing capability of the UE is defined based on a 20 MHz bandwidth and a TTI length of 1 ms and assuming that the UE may support a bandwidth of 40 MHz, when the TTI length is 0.5 ms, the base station may configure the UE to work on a 40 MHz bandwidth, if the processing delay requirements are untoggled, the sum of the maximum TBS and the TBS of each TB that can be processed by the UE may be untoggled. In this example, the reference TTI length is 1 ms, the reference bandwidth is 20 MHz, the actual TTI length is 0.5 ms, and the actual bandwidth is 40 MHz. It can also be considered that the changing factor of the processing ability of the UE=(the length of the actual TTI of the actual bandwidth)/(the reference TTI length the reference bandwidth), so the processing capability of the UE is untoggled.

Or, when defining UE categories, the processing capability of the UE may also be defined according to different values of the system parameters separately. The system parameters used to define the processing capability of the UE may include the SCS and/the TTI length, and so on. The processing capability include the number of soft buffered bits, the maximum TBS that can be demodulated within a TTI and the sum of the TBS of multiple TBs that can be demodulated at a certain processing delay requirement, and so on. According to the different system parameters, the defined UE processing capability is different generally. For example, as the TTIs become shorter and the processing delay requirements increase, the maximum TBS supported by the UE within the TTI decreases.

Embodiment Four

As for the downlink transmission, control information including the PDCCH is transmitted on some time-frequency resources within a TU or a MTU, while the PDSCH is transmitted on the other time-frequency resources. When performing a rate matching for the PDSCH, influences of the time-frequency resources assigned to the PDCCH need to be considered. A method of the rate matching for the PDSCH related to processing the control channel of the present disclosure is described below.

In one aspect, it is configured that a part or all of the multiple control resource sets detected by the UE can not transmit the PDSCH. A first processing method is that, assuming that the UE detects a PDCCH of the PDSCH scheduling the UE on a control resource set, the UE considers that all the time-frequency resources of the control resource set do not transmit the PDSCH thereof; and for the other control resource sets failing to detect a PDCCH of the PDSCH scheduling the UE, which overlaps with the PDSCH scheduled to the UE currently, may be used for data transmission of the UE if not violating the other restriction conditions. A second method is that for all the control resource sets configuring the UE to detect the PDCCH, the UE considers that all the time-frequency resources of each control resource set do not transmit the PDSCH thereof.

On the other aspect, the high layer signaling is used to configure a set of time-frequency resources that can not be used for transmitting the PDSCH. A typical configuration is that the set of time-frequency resources that can not be used for transmitting the PDSCH includes the control resource set(s) that may be used for transmitting the UE or the other UEs. However, the present disclosure does not limit to such inclusion. Specifically, a method for configuring the set of time-frequency resources that can not be used for transmitting the PDSCH and the control resource set that can not be used for transmitting the PDSCH may be determined by the base station. Except for the set of time-frequency resources that can not be used for transmitting the PDSCH, if the time-frequency resources of a control resource set overlaps with the PDSCH scheduling the UE currently, the control resource set can be used for data transmission of the UE if not violating the other restriction conditions. Here, the high layer signaling may be used for configuring only one set of the time-frequency resources that can not be used for transmitting the PDSCH; alternatively, the high layer signaling also may be used for configuring N sets of the time-frequency resources that can not be used for transmitting the PDSCH, and the RE mapping of the current PDSCH needs to avoid which set(s) of time-frequency resources that can not be used for transmitting the PDSCH is indicated dynamically.

When the first type of service and the second type of service coexist, each type of service may be configured with the control resource set(s) separately, and may be configured with the set(s) of time-frequency resources that can not be used for transmitting the PDSCH respectively. A first method for processing a rate matching is as follows: for a type of service, when performing the rate matching, the rate matching of the PDSCH may be processed only according to the control resource set(s) and the set(s) of time-frequency resources that can not be used for transmitting the PDSCH, of the type of service. As shown in FIG. 6, taking the first type of service as an example, when performing the rate matching, the rate matching of the PDSCH may be processed according to the control resource set(s) and the set(s) of time-frequency resources that can not be used for transmitting the PDSCH, of the first type of service, and other time-frequency resources can be used for transmitting the PDSCH if there are no other restrictions. A second method for processing the rate matching is as follows: when processing the rate matching of a PDSCH for a type of service, in addition to considering the control resource set(s) and the set(s) of time-frequency resources that can not be used for transmitting the PDSCH, of a type of service, it is also required to consider to configure the control resource set(s) and the set(s) of time-frequency resources that can not be used for transmitting the PDSCH, of another type of service. As shown in FIG. 7, taking the first type of service as an example, when processing the rate matching of the PDSCH, on the one hand, it is necessary to consider both the control resource set(s) and the set(s) of time-frequency resources that can not be used for transmitting the PDSCH, of the first type of service, and the control resource set(s) and the set(s)

of time-frequency resources that can not be used for transmitting the PDSCH, of the second type of service, and other time-frequency resources can be used for transmitting the PDSCH if there are no other restrictions. A third method for processing rate matching is as follows: when processing the rate matching of a PDSCH for a type of service, in addition to considering the control resources set(s) and the set(s) of time-frequency resources that can not be used for transmitting the PDSCH of the type of service, it also needs to consider to configure the control resource set(s) of another type of service. A fourth method for processing rate matching is as follows: when processing the rate matching of a PDSCH for a type of service, in addition to considering the control resource set(s) and the set(s) of time-frequency resources that can not be used for transmitting the PDSCH of the type of service, it also needs to consider to configure the set(s) of time-frequency resources that can not be used to transmit the PDSCH of another type of service.

Based on the four methods of processing the rate matching above, the rate matching may be processed by adopting the same method of processing the rate matching for the two types of services, or the rate matching may be processed by adopting different methods of processing the rate matching. For example, for the first type of service, the UE may adopt the first method when processing the rate matching. In this way, on the one hand, when the second type of service is not scheduled actually in a TU, or the PDCCH of the second type of service does not overlap with the PDSCH of the first type of service, available number of REs of the PDSCH of the first type of service are increased, so that the downlink resource utilization is improved; on the other hand, when the PDCCH of the second type of service overlaps with the PDSCH of the first type of service, the base station may punch the first type of service, that is, the PDCCH of the second type of service is transmitted on the overlapping time-frequency resources, so that the transmission of the second type of service is not affected. For example, for the second type of service, the UE may adopt the second method of processing the rate matching when processing the rate matching. With this method, in the case of transmitting the PDSCH of the second type of service, the transmission of the PDCCH of the first type of service may not be affected. Otherwise, when the PDSCH of the second type of service overlaps with the PDCCH of the first type of service, the PDSCH of the second type of service may affect the reception of the PDCCH of the first type of service because the base station needs to prioritize the performance of the second type of service, thus the normal transmission of the first type of service is affected seriously. For example, even though the PDSCH of the scheduled first type of service does not conflict with the second type of service, the UE still can not receive the PDSCH of the first type of service successfully, because the second type of service interferes with the reception of the PDCCH.

Embodiment Five

For a downlink data transmission, it is assumed that one transmission of a TB of the first type of service overlaps with time-frequency resources of the second type of service partially. For example, if the base station only transmits data of the second type of service on the overlapping time-frequency resources, when retransmitting the first type of service, the base station may only retransmit CBs/CBGs on the time-frequency resources, affected by the second type of service, of the TB. Alternatively, when a amount of the downlink data transmission is large, that is, the TB is larger, results of successful transmission or unsuccessful transmission of each CB/CBG within a TB may be different, for example, M CBGs in a TB, and only M3 CBGs are transmitted incorrectly, while the UE receives (M-M3) CBGs correctly, the base station may only retransmit M3 CBGs of the TB.

Retransmissions in the present disclosure include two types. One is that the UE needs to flush a HARQ buffer of the CBs/CBGs scheduled to be retransmitted, and the other is that the UE does not need to flush the HARQ buffer of the CBs/CBGs scheduled to be retransmitted, but to combine the received data with the HARQ buffer of the CBs/CBGs. For the UE, in an implementation method, the base station may instruct the UE so that the UE can distinguish (x) a new transmission, (y) a retransmission without needing the UE to flush the HARQ buffer of the CBs/CBGs scheduled to be retransmitted and (z) a transmission needing the UE to flush the HARQ buffer of the CBs/CBGs scheduled to be retransmitted. In another implementation method, the base station may instruct the UE so that the UE can distinguish that the retransmission without needing the UE to flush the HARQ buffer of the CB/CBG scheduled to be retransmitted, and the new transmission or the transmission with needing the UE to flush the HARQ buffer of the CB/CBG scheduled to be retransmitted, but the UE can not distinguish the new transmission and the transmission with needing the UE to flush the HARQ buffer of the CB/CBG scheduled to be retransmitted.

Preferably, the base station can only schedule CBGs (including y and z) needing to be retransmitted in one transmission. That is, the CBGs from the different TBs are not allowed to be scheduled by the same DCI.

Alternatively, the base station may schedule both a retransmitted CBG and a newly transmitted CBG in one transmission.

In order to support scheduling the retransmission/the new transmission of the CBGs flexibly, the downlink scheduling signaling DCI includes at least one of the following, (1) Indications of a Number of CB/CBGs Scheduled to be Transmitted In an implementation method, (1.1) each CB/CBG has a separate bit field used for indicating whether or not the CB/CBG is transmitted. For example, it is assumed that the DCI may support a transmission up to 4 CBGs. Then, for the 4 CBGs, there is 1 bit in each CBG to indicate whether or not the base station schedules the CBG. For example, 1 for scheduling, 0 for no scheduling. Alternatively, for the 4 CBGs, there is 1 bit in each CBG respectively, if the 1 bit is toggled with respect to an initial transmission scheduling the same TB, it indicates that the CBG is not scheduled, and if the 1 bit is untoggled with respect to the initial transmission scheduling the same TB, it indicates that the CBG is scheduled. However, for the initial transmission, the bit may not be used to indicate whether or not the corresponding CB/CBG is scheduled, instead, the number of the CBs/CBGs scheduled at the initial transmission is determined by the TBS and predefined rules of grouping the CBs/CBGs.

In another implementation method, (1.2) whether or not the base station has scheduled the CB/CBG is indicated by a combination of part of control parameters for each CB/CBG. For example, the control parameters of each CB/CBG may refer to a NDI and a RV. Assuming that the NDI is 1 bit, RV is 2 bits. Well, there are 8 types of combinations of the NDI and the RV. The system pre-defines one or more combinations of them, which indicates the CB/CBG is not scheduled to be transmitted. Preferably, the NDI indicating a new transmission is combined with a RV most unlikely to be used for a new transmission, for example, a combination of the NDI=1 and RV=1, indicating a new transmission or a combination of NDI=X1 and RV=Y1.

In another implementation method, (1.3) a number of CBs/CBGs scheduled by the base station is indicated by N bits. For example, the DCI may support a transmission up to 4 CBGs, N=2. Then, the base station may be instructed to schedule k CBs/CBGs, wherein k=1, 2, 3, or 4. When k<4, the CBs/CBGs from the 1th to the kth are scheduled in the DCI, then bit fields of the scheduled CBs/CBGs, such as RV/NDI information, are valid, while the CBs/CBGs from the (k+1)th to the 4th are not scheduled, the indication information of the bit fields of the unscheduled CBs/CBGs is invalid and may be used as redundant bits.

In another implementation method (1.4), a number of CBs/CBGs of a TB (or multiple TBs, for example, MIMO may support 2 TBs) scheduled by the base station is indicated by N bits, and in combination with (1.1), that which CBs/CBGs is scheduled, is determined and that which CBs/CBGs is not scheduled, is determined. Preferably, for a DCI scheduling an initial transmission of the TB, the number of CBs/CBGs indicated by the N bits is the number of CBs/CBGs scheduled by the DCI; for the DCI scheduling a retransmission of the TB, the number of CBs/CBGs indicated by the N bits is not the number of CB/CBGs scheduled by the DCI but the number of CBs/CBGs corresponding to the TB corresponding to the CBs/CBGs scheduled by the DCI. For example, assuming that a DCI may schedule up to 4 CBGs, then N=2 bits. The base station schedules one TB initially, which is divided into three CBGs, and the DCI scheduling the initial transmission indicates 10, and 1 bit in each CBG is 1,1,1,0 respectively. If the second CBG is affected by the URLLC service, the base station schedules the TB for the second time and only schedules the second CBG of the TB. Then, the indication in the DCI is still 10, which does not indicate that the three CBGs are scheduled in this time, but indicate that the TB corresponding to the CBG has 3 CBGs. And 1 bit in each CBG is 0, 1, 0, 0, respectively. The advantage is when the UE receives a DCI again after missing the DCI scheduling the data transmission, the UE may determine the number of CBGs corresponding to the TB size in the DCI through the 2 bits so as to determine the size of the CBG, and determine whether or not the CBG is transmitted by the 1 bit of each CBG. In order to make the UE to determine which CBG in the last retransmission is combined with the CBG of the received retransmission, it is necessary to ensure that an index of the CBG used for the retransmission is the same as an index of the CBG needing to be combined in the last transmission.

For example, assuming that the DCI may support a transmission up to 4 CBGs. On the downlink TU i1, the base station schedules 4 CBGs, all of which are new transmissions. The UE does not decode the third CBG transmission correctly, and feeds back a NACK, and the other three CBGs are decoded correctly, an ACK is fed back. In downlink TU i2, the base station schedules two CBGs, which are the first and third CBGs respectively, of which the first CBG is a new transmission and the third CBG is a retransmission. According to (1.1), the base station may set the 1 bit indication of the first CBG and the third CBG to be 1 to indicate being transmitted, and set the 1 bit indication of the second and fourth CGB to be 0 to indicate being untransmitted. Or according to (1.2), the base station may set the NDI of the first CBG as a new transmission indication, and may set the RV to indicate a redundancy version, but the RV may not be equal to Y1 (Y1=1). The NDI of the third CBG is set as the retransmission indication, and RV indicates the redundancy version. And the NDIs of the second and the fourth CBGs are set as the new transmission, RV=1, indicating that the NDI is not transmitted. Alternatively, according to (1.3), the base station may set N to be 3 to indicate to retransmit 3 CBGs, CBGs from the first to the third. The fourth CBG is not transmitted. The method can not support the CBGs with the new transmission to be transmitted together.

When the UE operates in a MIMO work mode, multiple TBs may be scheduled for one transmission. For the multiple TBs, each TB has an indication of a number of the CBs/CBGs scheduling the transmission independently. For example, for 2 TBs, each TB may schedule up to 4 CBGs, then each TB has 4 bits.

When the UE operates in the MIMO work mode, multiple TBs may be scheduled for one transmission. For the multiple TBs, each TB may indicate whether or not the TB schedules a transmission individually. When the DCI can indicate whether the scheduling is a TB-based scheduling or a CBG-based scheduling dynamically, for example, both cases adopt the same DCI length and are distinguished by an 1 bit identifier, that the 1 bit identifier may be set to be a scheduling based on the CBG, and the scheduling transmission indication of all the CBGs included in the TB is set to be a non-scheduling state (for example, 1 indicates scheduling and 0 indicates no scheduling, then all the CBGs are set to 0) in the retransmission, indicates the TB is not scheduled; Or, by setting the 1 bit identifier to be a scheduling based on the TB, according to a predefined bit combination such as MCS=0 and RV=1, it is indicated the TB is not scheduled; or, by setting the 1 bit identifier to be a scheduling based on the CBG, according to a predefined bit combination, such as MCS=0 and RV=1, it is indicated the TB is not scheduled.

An indication of a number of CBs/CBGs scheduling the transmission in the implementation method (1.1), (1.3) or (1.4) may be a single bit field or a partial bit field during the transmission of the TB, such as a TB-level MCS bit. The present disclosure does not limit to this.

When the reused MCS bits are not enough to support indications of all the CBs/CBGs, they can be combined with other bits to indicate CBs/CBGs scheduling transmission. For example, the maximum number of CBs/CBGs configured by the base station is 4, it is assumed that the MCS in the DCI of the CBG-level scheduling only uses 2 bits to indicate a modulation mode in a retransmission, similar to MCS=29-31 in LTE, and the remaining 3 bits and 1 bit of the other bit fields can be used to indicate a scheduling transmission of the 4 CBs/CBGs. The 1 bit of the other bit fields may be a reserved bit in the DCI of the TB-level scheduling. In another implementation method, a length of the MCS bit field used in the DCI of the TB-level scheduling is Lc1 bits, all of which may be used to indicate an MCS value, such as a MCS bit field of 6 bit, which may indicate up to 64 MCS values, or a part of which may be used to indicate the MCS value and the remaining bit state is reserved. The MCS bit field of 6 bit may indicate at least modulation and coding information and scheduling transmission information of the 4 CBs/CBGs in the DCI of the CBG-level scheduling.

(2) HARQ Relevant Indications for Each CB/CBG

One implementation method, (2.1) including a NDI indicating an initial transmission or retransmission of each CB/CBG, as well as a RV indicating a redundancy version of each CB/CBG, and including the NDI indicating an initial transmission or retransmission of the TB. Alternatively, (2.2) including the NDI indicating the initial transmission or retransmission of each CB/CBG, and the RV indicating the redundancy version of each CB/CBG.

Wherein, the redundancy version corresponding to the RV bits may be predefined by the standard or configured by the high layer signaling.

In another implementation method, (2.3) including only the NDI indicating the initial transmission or retransmission of each CB/CBG and the TB-level redundancy version information and including an NDI indicating the initial transmission or retransmission of the TB. Or, (2.4) including only the NDI indicating the initial transmission or retransmission of each CB/CBG, as well as the TB-level redundancy version information.

The redundancy version information, specifically, the redundancy version is used for all CBGs except the CBGs of (z). The redundancy version of the CBGs of (Z) is predefined, for example RV=0.

Preferably, the TB-level redundancy version information is applicable to all the CBs/CBGs for the initial scheduling.

Preferably, when all the retransmitted CBs/CBGs are (z), the TB-level redundancy version information is applicable to all the CBs/CBGs.

For example, a 2-bit RV in a DCI. The base station transmits a TB, which is divided into 4 CBGs. Because time-frequency resources of the third CBG overlaps with a URLLC, the base station transmits only the first, second, and fourth CBGs completely, and the third CBG is not transmitted completely, in the initial transmission. Assuming that the UE decodes the first CBG correctly and the second and fourth CBGs are not decoded correctly. Therefore, the base station retransmits the second, third and fourth CBGs again. The 2-bit RV in the DCI is suitable for the second and fourth CBGs, while the RV of the third CBG is a predefined as 0.

Preferably, the redundancy version information is indicated in a unit of a transmission block. Wherein, if all the data blocks in the same scheduling are located in a data block that is not scheduling a transmission initially and needs to be flushed the buffer by the UE, the redundancy version of the data blocks is determined according to the indicated redundancy version information. If a data block in the same scheduling includes a data block that is not scheduling a transmission initially and need to be flushed the buffer by the UE and also includes data blocks of other transmission states, the former is determined according to the predefined RV and the latter is determined according to the indicated RV information.

There is also an implementation method, (2.5) an NDI that indicates an initial transmission or retransmission of each CB/CBG is contained and an NDI that indicates an initial transmission or retransmission of the TB, and TB-level redundancy version information are included, or (2.6) an NDI that indicates the initial transmission or retransmission of each CB/CBG and TB-level redundancy version information are included. The redundancy version information in the DCI is applicable to all the CBGs scheduled by the DCI, that is, being applicable to the CBGs in all three states (x) (y) (z).

NDIs of all the methods adopt toggled/untoggled forms to distinguish between (x)/(z) and (y). In an implementation method, the toggled/untoggled forms are both relative to the latest transmission associated with the same TB. In another implementation method, the toggled/untoggled forms are both relative to the initial transmission scheduling associated with same TB.

When the UE operates in a MIMO work mode, multiple TBs may be scheduled by one transmission. For multiple TBs, in an implementation method, each TB has an independent HARQ relevant indication of each CB/CBG. For example, for 2 TBs, each CB may schedule up to 4 CBGs, then each TB has 4 bits. In another implementation method, a plurality of TBs share the HARQ relevant indication of each CB/CBG. By (1) indicating the HARQ information of the CB/CBG of the TB having a large number of CBs/CBGs at an initial transmission explicitly, or (2) by indicating the HARQ information of the CB/CBG of the TB with a large number of CBs/CBGs at each scheduling, the HARQ information of the CB/CBG of other TBs overlapping with the CB/CBG in time-frequency resources, is indicated indirectly. When the number of CBs/CBGs in each TB is the same, the HARQ information of the CB/CBG of the TBs with smaller TB indexes is indicated explicitly, for example, the first TB.

Preferably, when a CB/CBG of a TBi overlaps with multiple CBs/CBGs of another TBj, whether or not the CB/CBG of the TBj is based on an indication of the corresponding CB/CBG of the TBi to determine the state of the CB/CBG, is determined according to a size of the overlapping resources. The size of the overlapping resources is a predefined RE number of the time-frequency resources or a proportion of a number of the overlapping REs and the total number of REs containing the CBs/CBGs of the REs. For example, if a CBG of the first TB indicates state (z), a RE of a CBG of the second TB overlaps with a RE of the CBG of the first TB, then if the CBG of the second TB is scheduled, then the status of the CBG is (y), and it does not need to flush the storage.

Preferably, when a CB/CBG of a TB overlaps with multiple CBs/CBGs of another TB, and HARQ information indicated by the multiple CBs/CBGs is different, it is necessary to determine according to (z). It should be noted that the HARQ indication information is only valid to the scheduled CBs/CBGs. For example, the base station schedules 2 TBs, wherein TB1 may be divided into 4 CBGs, and TB2 may be divided into 3 CBGs. A relationship of the time-frequency resources occupied by each CBG of the two TBs is shown in FIG. 9. Assuming a downlink slot has 7 symbols, of which the third symbol is used for transmitting an URLLC, that is, the base station transmits eMBB services of the two TBs on symbols 1, 2, and 4 to 7, and transmits the URLLC on the third symbol. Then, when scheduling an eMBB retransmission, the base station instructs to schedule the second CBG of TB1 in the DCI, and the HARQ state of the CBG is (z), the UE flushes the retransmission of a HARQ buffer of the CB/CBG scheduled to be retransmitted. Then, if the first CBG and second CBG of TB2 are also scheduled in the DCI, the HARQ states of the two CBGs are both (z), because the first CBG and second CBG of TB2, and the second CBG of TB1 overlap each other on the time-frequency resources.

(3) Indications of a Bit Number of Each CB/CBG.

The bit number refers to the bit number before a channel coding.

The bit number refers to the bit number before a CRC encoding.

Preferably, an implementation method (3.1): a number of CBGs is determined according to the method (1), and a size of each CBG is determined according to a TB size indicated in the DCI. For example, the CBG size may be determined by the number of CBs/CBGs corresponding to a TB indicated by the DCI in (1.4) and the TB size indicated by the DCI.

Preferably, another implementation method (3.2) may be that the bit number of each CB/CBG is indicated explicitly and independently, or the bit number of the CB/CBG of a reference is indicated explicitly, and an offset of a size of each CBG group, corresponding to the reference, is indicated. When indicating the size of a CBG, the size of the CBG may be determined by a number of the RBs of the downlink TU, a MCS index, and a number of CBGs transmitted at the same time. For example, a size of the CBG, CBGS1, is determined by the number of RBs and, a manner adopted by the MCS index, the same as the LTE, or the size of the CBG is determined as $\lfloor CBGS1/M \rfloor$, by the number of the RBs and the MCS index and the number M of the CBGs.

Preferably, another implementation method (3.3) may be that the bit number of a CB/CBG is indicated explicitly and the bit number of each CB/CBG is equal.

Preferably, the indication of the bit number of each CB/CBG may also indicate jointly modulation coding information.

Preferably, the bit number of each CB/CBG is not all required to indicate explicitly. The bit number of each CB/CBG is determined by a TBS, a predefined CB/CBG grouping rule.

(4) Indications of a Transmission State of Each CB/CBG.

The transmission state of the CB/CBG may be one of the following manners, (4.1) The transmission state of the CB/CBG is (x)/(z) or (y) for the transmission block.

(4.2) The transmission state includes (x) a new transmission (initial scheduling transmission), (y) a retransmission without needing the UE to flush the HARQ buffer of the CB/CBG scheduled to be retransmitted and (z) a retransmission with possible needing the UE to flush the HARQ buffer of the CB/CBG scheduled to be retransmitted (whether or not the UE flushes the HARQ buffer is reserved for the UE to implement and the present disclosure does not limit to this), and (w) being untransmitted/unscheduled. For example, the four states may be represented by 2 bits, 00 means (x), 01 means (y), 10 means (z) and 11 means (w).

For example, the number of CBGs that may be scheduled by the base station is up to 4. The base station transmits a TB, which is divided into 3 CBGs. For an initial transmission, the transmission state of the first, second and third CBG is (x) a new transmission, the transmission state of the fourth CBG is (w) being untransmitted/unscheduled. Since the time-frequency resources of the third CBG overlaps with the URLLC, the base station transmits only the first and second CBGs completely, and the third CBG is not transmitted completely. Assuming that the UE decodes the first CBG correctly and does not decode the second CBG and third CBG correctly, the base station schedules to transmit the second CBG and third CBG again, wherein the transmission state of the second CBG is (y) and the transmission state of the third CBG is (z).

(4.3): The transmission state includes (y) a retransmission, (x) a new transmission/(z) a retransmission with needing the UE to flush the HARQ buffer of the CB/CBG scheduled to be retransmitted, (w) being untransmitted/unscheduled, (u) having been scheduled to transmit previously but being unscheduled/untransmitted in the current schedule. For example, the 4 states may be represented by 2 bits.

Preferably, one or more indications (1) to (4), included in the DCI may be used in combination. Only a few examples are given below, but not limited thereto. For example, adopting the method of (1.4), (2.1), (3.1). That is, →a TB-level indication 2 bits indicates the number of CB/CBGs corresponding to a TB.

1 bit NDI of the TB, that the TB is a new TB, is represented by reversing, that the TB is a retransmitted TB, is invariant.

TB size

→a CB/CBG-level indication 1 bit indicates whether or not each CB/CBG is scheduled/transmitted 1 bit NDI of each CB/CBG, that (x) the CB/CBG is a new CBG or (z) the CBGs needing to be flushed the buffer is represented by toggling, the CB/CBG is (y) with no needing to flush the buffer is represented by being untoggled.

1 bit RV of a redundancy version of each CB/CBG.

It is easy to see that if a TB is a new transmission, the 1 bit NDI of the TB should be toggled and the NDI of each scheduled CB/CBG should also be toggled. If a TB is a retransmission, the 1 bit NDI of the TB should be untoggled, but the NDI of part of CBGs, CB/CBG of the TB, may be reversed. For example, if the CBG of an eMBB is affected by the URLLC service, the CBG needs the UE to cleat the buffer to be re-received, that is (z). Alternatively, the NDI of the CB/CBG may be untoggled for a part of the CBGs of the TB, for example, since the CINR is lower, although the base station transmits the CB/CBG, but the UE does not demodulate correctly, the base station transmits the CB/CBG again, the UE may combine the received signal with the data in the buffer, that is (y). In the subsequent retransmission, the number of CBs/CBGs scheduled by the base station may be smaller than the number of CBs/CBGs scheduled in the initial transmission, but the size of CB/CBG is determined according to the number of CBs/CBGs in the initial transmission and the TB size indicated in the DCI.

Or, the implementation methods (1.1), (2.2), (3.1) are adopted. that is,

→a TB-level indication:

TB size

→a CB/CBG-level indication:

1 bit indicates whether or not each CB/CBG is scheduled/transmitted.

1 bit NDI of each CB/CBG, that (x) the CB/CBG is a new CBG or (z) the CBGs needing to be flushed the buffer is represented by toggling, the CB/CBG is (y) with no needing to flush the buffer is represented by being untoggled.

1 bit RV of a redundancy version of each CB/CBG.

It is easy to see that if a TB is a new transmission, the NDI of each CB/CBG should be toggled. If a TB is a retransmission, the NDI of CBGs, part of CBs/CBGs of the TB, may be reversed. For example, if the CBG of an eMBB is affected by the URLLC service, the CBG needs the UE to flush the buffer to be re-received, that is (z). Alternatively, part of the CBGs of the TB, the NDI of the CBs/CBGs may be invariant, for example, since the CINR is lower, although the base station transmits the CB/CBG, but the UE does not demodulate correctly, the base station transmits the CB/CBG again, the UE may combine the received signal with the data in the buffer, that is (y). In the subsequent retransmission, the number of CBs/CBGs scheduled by the base station may be smaller than the number of CB/CBGs scheduled in the initial transmission, but the size of the CB/CBG is determined according to the number of CBs/CBGs in the initial transmission and the TB size indicated in the DCI.

Or, the implementation methods (2.5), (3.1), (4.3) are adopted. that is,
→a TB-level indication:
TB size
1 bit NDI per TB, that the TB is a new TB, is represented by toggling, that the TB is a retransmitted TB, is untoggled.
2 bits RV of the redundant version, which is suitable for all CBs/CBGs.
→a CB/CBG-level indication:
2 bits indicate 4 transmission states, 00: (y) a retransmission, 01: (x) a new transmission/(z) a retransmission with possible needing the UE to flush the HARQ buffer of the CB/CBG scheduled to be retransmitted, 10: (w) being untransmitted/unscheduled, 11: (u) having been scheduled to transmit previously but being unscheduled/untransmitted in the current schedule.

It is easy to see that if a TB is a new transmission, the 1 bit NDI of the TB should be reversed, and each scheduled CB/CBG should be (x) a new transmission. If a TB is a retransmission, then the 1 bit NDI of the TB should be untoggled, then each CBG of the TB, may be either (y), or (z), or (w), or (u).

Obviously, (x) the new transmission may be represented by the reversing of the NDI of the TB+01, and the untoggling of the NDI of the TB+01 indicates (z) a retransmission with needing to flush the HARQ buffer of the CB/CBG scheduled to be retransmitted. When calculating the CB/CBG, (x) (y) (z) (u) all indicates that one TB corresponds to the CBG, wherein, (x) (y) (z) indicates that the CB/CBG is scheduled currently, (u) indicates that the CB/CBG is not scheduled currently, but the CB/CBG belongs to the TB, and (w) indicates that the TB does not include the CB/CBG.

The CBGs of (x) (y) all adopt the indicated TB-level redundancy version, the redundancy version of the CBGs of (z) is predefined, for example RV=0.

Or, the implementation methods (1.1) and (2.4) are adopted. that is,
*174→a TB-level indication:
TB size
2 bits RV of the redundant version
→a CB/CBG-level indication:
1 bit indicates whether or not each CB/CBG is scheduled/transmitted. For a retransmission, being toggled, with respect to the initial transmission scheduling the same TB, indicates no transmission, untoggling indicates transmission. If it is an initial transmission, all bits are toggled with respect to the initial transmission of the previous TB scheduling the same HARQ process.
The 1 bit NDI of each CB/CBG, represents (x) the CB/CBG is a new CBG or (z) the CBG needing to flush the buffer, by the toggling with respect to the last transmission scheduling the same TB, untoggling indicates the CB/CBG is (y) the CBG without flushing the buffer.

If and only if "whether or not each CB/CBG is scheduled/transmitted" in the DCI of the present transmission "are all reversed, with respect to "whether or not each CB/CBG is scheduled/transmitted" in the DCI of the initial transmission of the previous TB scheduling the same HARQ process, that the present transmission is a new transmission (x) is represented, otherwise the present transmission is not a new transmission. For example, for a first transmission of a TB, NDIs of all CBGs in the DCI for the present transmission are the same value certainly, and all of the NDIs are toggled with respect to the initial transmission of the previous TB scheduling the same HARQ process. If it is a new transmission, the number of scheduled CBGs actually is determined according to the TBS and the predefined CB/CBG grouping rule, that is, it is not necessary to determine, according to the value of the bit field, whether or not the corresponding CB/CBG is scheduled.

Preferably, when the number of CBGs included in a TB is different from the number of CBGs included in the current TB, all the bits of "whether or not each CB/CBG is scheduled/transmitted" in the DCI scheduling the current TB transmission are toggled to indicate that the current transmission is a new transmission (x). For example, the number of schedulable CBGs configured by the base station is up to 4, and the total number of bits of "whether or not each CB/CBG is scheduled/transmitted" in the DCI is 4. The TB size of the previous TB is small and the TB may only be divided into 3 CBGs, the TB size of the current TB is also small and may be divided into 2 CBGs. According to the method above, although the number of CBGs corresponding to the TB is less than 4, it is still necessary to set the values of 4 bits of "whether or not each CB/CBG is scheduled/transmitted" to be the same value in every initial transmission, and the value of the 4 bits are all toggled with respect to the value of the 4 bits of the initial transmission of the previous TB, which indicates that the current TB is a new transmission.

Alternatively, the bits of "whether or not each CB/CBG is scheduled/transmitted" corresponding to all valid CBGs in the DCI scheduling the current TB transmission are reversed to indicate that the current transmission is a new transmission (x). The valid CBGs are determined by dividing a TB, based on the TB size. For example, the number of schedulable CBGs configured by the base station is up to 4, and the total number of bits of "whether or not each CB/CBG is scheduled/transmitted" in the DCI is 4. The TB size of the previous TB is small and may only be divided into 3 CBGs, so the number of valid CBGs is 3. The TB size of the current TB is small and may be divided into 2 CBGs, so the number of valid CBGs is 2. According to the method above, it is only necessary to set the values of 2 bits of "whether or not each CB/CBG is scheduled/transmitted" of the valid CBGs (2 CBGs in the present example) in the current initial transmission are all toggled (in the present example, the bit of the third CBG of the current TB is not limited to be reversed with respect to the bit of the third CBG of the previous TB), with respect to the value of the 2 bits of the initial transmission of the previous TB, which indicates that the current TB is a new transmission.

It should be noted that the description above is for the physical layer. For the MAC layer, in order to avoid complicated operations, it can still be regarded as an NDI in the unit of TB, that is, a new TB is indicated by toggling, and a retransmission is indicated by untoggling. The NDI in the unit of a TB is determined based on values of multiple bits of "whether or not each CB/CBG is scheduled/transmitted" in the physical layer, for example, states of all bits of "whether or not each CB/CBG is scheduled/transmitted" are performed the AND operation. If all of them are toggled, the NDI in the unit of TB is toggled, otherwise, the NDI in the unit of TB is not toggled.

If DCI formats of the new transmission and the retransmission are different (including the same DCI overhead but different explanation of the bit fields), for example, the DCI of the initial transmission does not include any indication related to the CB/CBG according to the scheduling based on the TB, existing in LTE and the retransmitted DCI is indicated according to the method described above, if the bits of "whether or not each CB/CBG is scheduled/transmitted" in the DCI of the current transmission is toggled with respect to the TB-level NDI of the last initial transmission, that the current transmission is a retransmission of a new TB, is indicated. For example, assuming that the DCI can support transmission up to 4 CBGs, on the downlink TU i1, the base station schedules a TB, which is divided into 4 CBGs, and the base station transmits the DCI of a TB-level scheduling, wherein the TB-level NDI is 1. The UE detects successfully and feeds back an ACK. In downlink TU i2, the base station schedules a new TB, which is divided into 4 CBGs, and the base station transmits the DCI of the TB-level scheduling, wherein the TB-level NDI is 0. The UE does not detect the DCI. In downlink TU i3, the base station schedules the retransmission of the TB and transmits the DCI of a CBG-level scheduling, wherein, the bit of "whether or not each CB/CBG is scheduled/transmitted" of the 4 CBGs is 0. The UE detects the DCI and determines that it is a retransmission. However, since the bit of "whether or not each CB/CBG is scheduled/transmitted" is toggled with respect to the TB-level NDI of the DCI of the downlink TU i1, so that the UE determines that the UE itself has missed the DCI of the current TB and that the DCI received this time is a retransmission of the undetected TB. The UE determines that the 4 CBGs are transmitted by the base station in the current retransmission according to the indication of the bit of "whether or not each CB/CBG is scheduled/transmitted" of the received DCI.

If it is not a new transmission, whether or not each CB/CBG is scheduled, is determined separately according to whether or not the bit of "whether or not each CB/CBG is scheduled/transmitted" is toggled with respect to the bit of "whether or not each CB/CBG is scheduled/transmitted" in the DCI scheduling the initial transmission of the same TB. If being reversed, it indicates no scheduling, if being not reversed, it means scheduling. And, for the scheduled CB/CBG, according to whether or not "NDI bit indication information indicating an initial transmission or retransmission of each CB/CBG" is toggled with respect to "the NDI bit indication information indicating an initial transmission or retransmission of each CB/CBG" in the DCI scheduled in the latest scheduling, scheduling the same TB, that the status of the scheduled each CB/CBG is (z) or (y), is determined respectively. If being reversed, it means the state of the CB/CBG is (z), if not, it means (y). For the unscheduled CB/CBG, the status of the bit is not limited by the present disclosure.

For example, assuming that the DCI may support a transmission up to 4 CBGs, in the downlink TU i1, the base station schedules 4 CBGs, all of which are new transmissions, the TB-level RV indicates 0, and the 4 CBGs has 2 bits respectively. Assuming that an initial state is 11,11,11,11, assuming that the first CBG was pre-empted by the URLLC, the other several CBGs are transmitted normally. The UE fails to decode the first and third CBG transmissions correctly, feeds back the NACK, and the other two CBGs are all decoded correctly and the ACK is fed back. In downlink TU i2, the base station schedules the first and third CBG retransmissions, the TB level RV indicates 2, and the 2 bits of the 4 CBGs indicate 10,00,11,00, respectively. Wherein, the 2 bits 10 of the first CBG indicates that the CBG is scheduled and the CBG state is (z), the 2 bits 11 of the third CBG indicates that the CBG is scheduled and the CBG state is (y). The other two CBGs represent no scheduling. The first CBG adopts RV=0, the third CBG adopts that the indicated RV=2. Assuming that the first and third CBGs are transmitted normally. The UE decodes the first CBG transmission correctly in this time, feeds back the ACK, but does not decode the third CBG correctly and feeds back the NACK. At downlink TU i3, the base station schedules the retransmission of the third CBG, the TB-level RV indicates 3, and the 2 bits of the 4 CBGs indicate 00,00,11,00, respectively. Wherein, 2 bits 11 of the third CBG indicate that the CBG is scheduled and the CBG state is (y). Assuming that the UE decodes the third CBG correctly and feeds back the ACK. In downlink TU i4, the base station schedules a new TB, and the base station schedules 4 CBGs, all of which are new transmissions, the TB-level RV indicates 0, and the 4 CBGs have 2 bits respectively, assuming that the initial state is 00,00,00, 00.

The description above mainly for the DCI scheduling a PDSCH, is also suitable for the DCI scheduling a PUSCH. For example, in the DCI scheduling a PUSCH,
→a TB-level indication:
TB size
2 bits RV of the redundant version
→a CB/CBG-level indication:
1 bit indicates whether or not each CB/CBG is scheduled/transmitted. For retransmissions, no transmission is indicated by toggling with respect to the initial transmission scheduling the same TB, untoggling indicates transmission. If it is an initial transmission, all bits are toggled with respect to the initial transmission of the previous TB scheduling the same HARQ process.

Embodiment Six

For the downlink data transmission, when the base station schedules partial CBG retransmissions in the M CBGs scheduling a TB, the base station may notify the UE whether the CBG is a retransmission or a new transmission through the bit field of the corresponding CBG in the downlink scheduling signaling DCI. For the specific indication manner, Embodiment 5 of the present disclosure is referred to. In order to make the UE to combine the received retransmitted CBG with the received bit of the CBG in the previous time, the base station may control the retransmission in a granularity of CBG in the following three manners, including the implementation of the numbers of bits of the scheduled retransmitted CBG currently and the CBG scheduled previously are the same, (1) If at least one retransmitted CBG is scheduled in the DCI of the current downlink TU, the size of the retransmitted CBG determined according to the DCI needs to be the same as the size of the CBG determined by the DCI scheduling the same CBG in the last time.

The UE Side behavior: if the size of the retransmitted CBG determined by the DCI received by the UE is the same as the size of the CBG determined by the DCI scheduling the same CBG in the last time, the UE may combine the retransmitted CBGs. If the size of the retransmitted CBG determined by the DCI received by the UE is different from the size of the CBG determined by the DCI scheduling the same CBG in the last time, it may be considered as an error condition, and the processing of the CBG by the UE may be reserved for the UE, or the UE discards the received CBG currently or the UE discards the received CBG previously so as to decode only according to the received CBG currently.

If the DCI only indicates the TB size explicitly, the size of the retransmitted CBG needs to be determined by the method of the present disclosure or by other methods. The TB size indicated by the DCI scheduling the retransmitted CBG currently may be the same as or different from the TB size indicated by the DCI scheduling the CBG in the last time. For example, assuming that the DCI may support the transmission up to 4 CBGs. In downlink TU i1, the base station schedules 4 CBGs, and all 4 CBGs are transmitted for the first time, and the TB size is TBS1. It is assumed that the TB may be divided into 4 CBGs equally, that is, the number of bits of each CBG is equal to TBS1/4. Wherein, the third CBG is transmitted unsuccessfully. In the downlink TU i2, the base station schedules 4 CBGs, of which the third CBG is indicated to be a retransmission, that is, the retransmission of the third CBG of the downlink TU i1, and the other three CBGs are the newly transmitted CBGs. From a physical layer point of view, it may be understood that multiple CBGs transmitted simultaneously in a scheduling are from the same TB, and the CBGs compose a new TB, whether the CBGs are retransmitted or newly transmitted. Alternatively, it may be understood that the retransmitted and newly transmitted CBGs, transmitted simultaneously in a scheduling are from different TBs. For the latter manners, there are two methods to achieve it. (1) The DCI of the downlink TU i2 in this example indicates to schedule 4 CBGs, which illustrates that the new TB is divided into 4 CBGs, that is, the TB size is equal to the total number of bits of the 4 CBGs, and only the data of 3 CBGs of the new TB is transmitted in the current TU, and the remaining one CBG of the new TB, may be transmitted in the next time. As long as the TB sizes indicated by the DCIs of the downlink TU i1 and the downlink TU i2 are the same, the number of bits of the third retransmitted CBG calculated by the UE according to the TB size is untoggled. (2) In this example, the DCI of the downlink TU i2 indicates to schedule 4 CBGs, which illustrates that the new TB is divided into 4 CBGs, all of the new TBs are transmitted in the current TU, that is, the TB size is equal to the total number of bits of 3 CBGs indicated to be anew transmission. In this case, it is still required to ensure that the size of the retransmitted CBG determined according to the DCI in the downlink TU i2, is the same as the size of the CBG determined by the DCI scheduling the same CBG in the last time.

Alternatively, in the downlink TU i2, the base station schedules 3 CBGs, the CBGs from the second to the fourth, wherein the third CBG is indicated to be a retransmission, that is, the retransmission of the third CBG of the downlink TU i1, and the first CBG and the fourth CBG are newly transmitted CBGs. The TB size indicated by the DCI of the downlink TU i2 is TBS2. It's easy to see, TBS2 is different from TBS1. The TBs with the TB size TBS2 may be divided into 3 CBGs equally, the size of the 3 CBGs is TBS2/3. Then, TBS2 and TBS1 are required to satisfy that TBS1/4=TBS2/3. Alternatively, TBS2 may also be the total number of bits of 2 CBGs indicated as the new transmissions, then it is required that TBS2 and TBS1 satisfy that TBS1/4=TBS2/2.

Alternatively, in the downlink TU i2, the base station schedules a CBG, the third CBG, and other CBGs are all indicated to be not transmitted. Wherein, the third CBG is indicated to be a retransmission, that is, the retransmission of the third CBG of the downlink TU i1. The TB size is TBS3. It is easy to see that TBS3=TBS1/4.

It should be noted that for determining manners of different CB/CBG sizes, the TB sizes indicated by the DCI in downlink TU i2 may be different in order to make the size of the same retransmission of the same CBGs to be the same as that of the CBG in the last transmission. However, the final result should make the size of the retransmission of the same CBG obtained by the DCI is the same as that of the CBG in the last transmission.

If the size of each CBG is indicated by the DCI explicitly, as the method in embodiment five, the DCI may indicate the size of a CBG explicitly and the sizes of all the scheduled CBGs are the same, or the DCI indicates a reference CBG explicitly, the size of all scheduled CBGs is determined based on the size of the reference CBG, and the size of the retransmitted CBGs may be determined by a value indicated by the DCI explicitly directly. For example, assuming that the DCI may support the transmission up to 4 CBGs. In the downlink TU i1, the base station schedules 4 CBGs, which are all transmitted for the first time, and the indicated size of the CBG is CBGS1, representing that the sizes of the 4 CBGs are all CBGS1. Wherein, the third CBG is transmitted unsuccessfully. In the downlink TU i2, the base station schedules 3 CBGs, the CBGs from the second to the fourth, wherein the third CBG is indicated to be a retransmission, that is, the retransmission of the third CBG of the downlink TU i1, and the first CBG and the fourth CBG are newly transmitted CBGs. The size of the CBG indicated by the base station is still CBGS1, illustrating that the sizes of the 3 CBGs are all CBGS1 regardless of the newly transmitted CBGs or retransmitted CBGs.

(2) If at least one retransmitted CBG is scheduled in the DCI of the current downlink TU, the TB size indicated by the DCI needs to be the same as the TB size indicated by the DCI scheduling the same CBG in the last time.

The UE side behavior: If the size of the TB indicated by the DCI received by the UE is the same as the TB size indicated by the DCI scheduling the same CBG in the last time, then the UE may combine the retransmitted CBGs. If the TB size indicated by the DCI received by the UE is different from the TB size indicated by the DCI scheduling the same CBG in the last time, it may be considered as an error condition, and the processing to the CBG by the UE may be reserved for the UE or the UE discards the received CBG currently or the received CBG previously.

For example, assuming that the DCI may support transmission up to 4 CBGs. In the downlink TU i1, the base station schedules 4 CBGs and all 4 CBGs are transmitted for the first time. Wherein, the third CBG is transmitted unsuccessfully. In the downlink TU i2, the base station schedules 4 CBGs, wherein the third CBG is indicated to be a retransmission, that is, the retransmission of the third CBG of the downlink TU i1, and the other three CBGs are the newly transmitted CBGs. The TB sizes indicated by the DCIs of the downlink TU i1 and the downlink TU i2 are the same, which makes the number of bits of the third retransmitted CBG calculated by the UE according to the TB size to be untoggled.

Or, in the downlink TU i2, the base station schedules the third CBG indication as a retransmission and the other three CBGs all indicate that it is not transmitted. Then, the UE assumes that as long as at least one CBG indicates a retransmission, the indicated TB size should be the same as the TB size indicated in the DCI scheduling the retransmitted CBG in the last time. The UE determines the size of the retransmitted CBG according to the number of scheduled CBGs indicated in the DCI scheduling the first transmission. Here, it is assumed that the base station does not combine the CBGs, of which the initial transmission is from different TBs, into a new TB to transmit. Therefore, in the present embodiment, in the downlink TU i2, the base station may only schedule the retransmission of the third CBG or may schedule a new TB but not to schedule the retransmission of the third CBG, and the CBGs included in the new TB are all the first transmission.

It is easy to see that when the DCI may only indicate the TB size, the size of the newly transmitted CBG scheduled with the retransmitted CBG is limited by the size of the retransmitted CBG, for either (1) or (2). In order to support more flexible schedulings, the size of each CBG may be indicated by the DCI explicitly according to the method in embodiment five.

(3) If at least one retransmitted CBG is scheduled in the DCI of the current downlink TU, the TB size indicated by the DCI needs to be the same as the TB size indicated by the DCI scheduling the same CBG in the last time.

The base station may indicate the modulation mode of retransmission through MCS>=Thr_mcs1, without indicating the TBS index. The TB size is considered to be the same as the TB size indicated by the DCI scheduling the same CBG in the last time. For example, Thr_mcs1=29.

The base station may also indicate the modulation mode of a retransmission and a TBS index through MCS <Thr_mcs1. The advantage is that when the UE misses the DCI scheduling the initial transmission but detects the DCI scheduling the retransmission, the UE may adopt the TBS of the initial transmission directly. If the retransmission is scheduled only based on MCS>=Thr_mcs1, when the UE does not receive the DCI scheduling the initial transmission, the data can not be received.

The modulation mode adopted by a retransmission and an initial transmission may belong to different modulation mode sets. For example, in the MCS table, the same MCS index may correspond to two modulation mode sets (corresponding to two columns of modulation modes in the table 1 respectively). The base station may indicate explicitly, by the DCI, which column modulation mode is used.

For a DCI scheduling the uplink transmission, the same method as the downlink scheduling may be adopted. That is, different from the DCI of the uplink scheduling of LTE, the RV and the MCS in the DCI are indicated respectively, and the MCS indicates the modulation mode, wherein the MCS=29-31.

*212 Similarly, the DCI scheduling the uplink transmission, the base station may indicate explicitly, according to the DCI, which column modulation mode is used. The modulation mode and values of the TBS index in the MCS table may be different from the downlink transmission.

TABLE 1 the MCS table

| MCS Index $I_{MCS}$ | Modulation Order $Q_m$ | Modulation Order $Q_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 2 | 5 |
| 6 | 2 | 2 | 6 |
| 7 | 2 | 2 | 7 |
| 8 | 2 | 2 | 8 |
| 9 | 2 | 2 | 9 |
| 10 | 4 | 2 | 9 |
| 11 | 4 | 2 | 10 |
| 12 | 4 | 2 | 11 |
| 13 | 4 | 2 | 12 |
| 14 | 4 | 2 | 13 |
| 15 | 4 | 2 | 14 |
| 16 | 4 | 2 | 15 |
| 17 | 6 | 4 | 15 |
| 18 | 6 | 4 | 16 |
| 19 | 6 | 4 | 17 |

TABLE 1-continued the MCS table

| MCS Index $I_{MCS}$ | Modulation Order $Q_m$ | Modulation Order $Q_m$ | TBS Index $I_{TBS}$ |
|---|---|---|---|
| 20 | 6 | 4 | 18 |
| 21 | 6 | 4 | 19 |
| 22 | 6 | 4 | 20 |
| 23 | 6 | 4 | 21 |
| 24 | 6 | 4 | 22 |
| 25 | 6 | 4 | 23 |
| 26 | 6 | 4 | 24 |
| 27 | 6 | 4 | 25 |
| 28 | 6 | 4 | 26/26A |
| 29 | 2 | 2 | reserved |
| 30 | 4 | 4 | |
| 31 | 6 | 6 | |

When the base station indicates a retransmitted TBS through MCS <Thr_mcs1, the base station may also indicate an adjustment factor β for determining the TBS, wherein β is determined according to $N_{PRB}$, when looking up the TBS according to a PRB number $N'_{PRB}$ occupied by the PDSCH, according to Table 7.1.7.2.1-1 in TS 36.213, wherein, $N_{PRB}=\lfloor N'_{PRB}\times\beta \rfloor$, and $N_{PRB}=\min(\lfloor N'_{PRB}\times\beta \rfloor, N_{PRBmax})$, $N_{PRBmax}$ is the maximum value of the PRB number available for transmitting data, β is a number greater than or equal to 1. For example, in an initial transmission, a TB includes 4 CBGs, wherein, one CBG needs to be retransmitted. A length of the time resources occupied by the PDSCH of the initial transmission and the retransmission is untoggled, but the frequency resources (PRB number) occupied by the retransmitted PDSCH is ¼ of that of the initial transmission. The base station may determine $N_{PRB}$ by indicating β=4, and may determine the TBS. At this time, the determined TBS should be the same as the TBS transmitted in the last time.

Preferably, the base station does not need extra bit field to indicate the adjustment factor β used for determining the TBS, and β is determined by the relationship between the number of CBGs scheduled in the retransmission and the total number of CBGs corresponding to the TB. For example, β=the number of CBGs in the present scheduling/the total number of CBGs of a TB. Alternatively, N βs are pre-defined, and β is determined according to the relationship between the number of CBGs scheduled in the retransmission and the total number of CBGs corresponding to the TB.

Preferably, when the base station indicates the modulation mode of a retransmission and the TBS index by MCS <Thr_mcs1, the base station indicates which modulation mode is adopted or bits of which TBS determination mode is adopted, which exist in the DCI used for scheduling the initial transmission and the retransmission. Or, the initial transmission (for example, the TB-based scheduling of LTE) determines the corresponding modulation mode and/or TBS according to a predefined rule, which is only in the DCI used for scheduling retransmission.

For example, assuming that the DCI may support transmission of up to 4 CBGs, on the downlink TU i1, the base station schedules a transmission of the PDSCH, the transmission is a new transmission of a TB, which may be divided into 4 CBGs. The PDSCH occupies 7 OFDM symbols. Assuming that, when determining the TBS, $N_{PRB}$ is $N_{PRB}=\max(\lfloor N'_{PRB}\times\beta \rfloor, 1)$, wherein $N'_{PRB}$ is a size of the PRB indicated by the DCI, β=1/2. The base station schedules the transmission of the PDSCH on downlink TU i2 for the retransmissions of the first CBG and the third CBG. The PDSCH occupies 3 OFDM symbols. The DCI transmitted by the base station is a DCI scheduled by the CBG, which in, the DCI contains 2 bits indicating a β value, for example, β=1, 0.75, 0.5 and 0.375. Based on the indicated 13 value, the TBS is determined.

Corresponding to the method above, the present application further discloses a device, which may be used to implement the method above.

FIG. 8 is a diagram illustrating a device 800 of the present disclosure.

As shown in FIG. 8, the device comprises a PDCCH detecting and analyzing module 810, a PDSCH receiving module 820, an HARQ-ACK information generating module 830 and an HARQ-ACK transmitting module 840. However, all of the illustrated components are not essential. The device 800 may be implemented by more or less components than those illustrated in FIG. 8.

The aforementioned components will now be described in detail.

The PDCCH detecting and analyzing module 810 may detect a PDCCH on a configured control resource set configured and analyze the PDCCH.

The PDSCH receiving module 820 may determine a method for dividing CBs and a method for rate matching of the PDSCH, and receive the PDSCH according to the PDCCH.

The HARQ-ACK information generating module 830 may generate HARQ-ACK information according to the PDSCH.

The HARQ-ACK transmitting module 840 may transmit the HARQ-ACK information.

FIG. 10 is a diagram illustrating a device 1000 according to another embodiment of the present disclosure.

Referring to the FIG. 10, the device 1000 may include a processor 1010, a transceiver 1020 and a memory 1030. However, all of the illustrated components are not essential. The device 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the device 1000 may be implemented by the processor 1010.

The processor 1010 may detect a PDCCH on a configured control resource set. The processor 1010 determine a method for dividing CBs and a method for rate matching of a PDSCH according to the PDCCH. The processor 1010 may control the transceiver to receive the PDSCH according to the PDCCH. The processor 1010 may generate HARQ-ACK information according to the PDSCH. The processor 1010 may control the transceiver to transmit the HARQ-ACK information.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the device 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

The foregoing is only preferred embodiments of the present application and is not used to limit the protection scope of the present application. Any modification, equivalent substitution and improvement without departing from the spirit and principle of the present application are within the protection scope of the present application.

The invention claimed is:

1. A method for transmitting and receiving data, by a terminal, comprising:
   identifying configured one or more control resource sets (CORESETs);
   receiving a higher layer signaling configuring one or more sets of resources including at least one CORESET of the configured one or more CORESETs;
   identifying at least one set of resources dynamically indicated as not available for a physical downlink shared channel (PDSCH) among the configured one or more sets of resources;
   receiving the PDSCH using resources other than the identified at least one set of resources;
   generating hybrid automatic repeat request acknowledge (HARQ-ACK) information according to the received PDSCH; and
   transmitting the HARQ-ACK information.

2. The method of claim 1, wherein the PDSCH includes code block groups (CBGs) of a transport block.

3. The method of claim 2,
   wherein the generating of the HARQ-ACK information comprises, in response to a maximum number of the CBGs being configured by a higher layer parameter, generating respective HARQ-ACK information bits for the maximum number of the CBGs, and
   wherein the respective HARQ-ACK information bits indicate acknowledgement (ACK) or negative acknowledgement (NACK).

4. The method of claim 2, wherein the generating of the HARQ-ACK information comprises, in response to receiving the PDSCH, generating the HARQ-ACK information for the transport block according to a downlink control information (DCI) format of a physical downlink control channel (PDCCH).

5. The method of claim 2, further comprising:
in response to a maximum number of the CBGs being M, grouping C code blocks to M CBGs,
wherein, if C>M and C is not divided by M, a number of CBs within each of $M_1$ CBGs is $K_1$, and
wherein a number of CBs within each of M2 CBGs is K2, $M_1$=mod(C,M), $$M_2 = M - M_1, K_1 = \left\lceil \frac{C}{M} \right\rceil, \text{ and } K_2 = \left\lfloor \frac{C}{M} \right\rfloor.$$

6. A non-transitory computer-readable recording medium on which a program for executing the method of claim 1 is recorded.

7. A method for transmitting and receiving data, by a base station, comprising:
determining one or more sets of resources including at least one control resource set (CORESET) of one or more CORESETs configured to a terminal;
transmitting, to the terminal, a higher layer signaling configuring the one or more sets of resources;
transmitting, to the terminal, the PDSCH using resources other than at least one set of resources, dynamically indicated as not available for a physical downlink shared channel (PDSCH) among the configured one or more sets of resources; and
receiving, from the terminal, HARQ-ACK information generated according to the PDSCH.

8. A terminal for transmitting and receiving data, the terminal comprising:
a transceiver;
at least one memory storing instructions; and
at least one processor configured to execute the stored instructions to:
identify configured one or more control resources sets (CORESETs),
receive a higher layer signaling configuring one or more sets of resources including at least one CORESET of the configured one or more CORESETs,
identify at least one set of resources dynamically indicated as not available for a physical downlink shared channel (PDSCH) among the configured one or more sets of resources,
control the transceiver to receive the PDSCH using resources other than the identified at least one set of resources,
generate HARQ-ACK information according to the received PDSCH, and
control the transceiver to transmit the HARQ-ACK information.

9. The terminal of claim 8, wherein the PDSCH includes code block groups (CBGs) of a transport block.

10. The terminal of claim 9,
wherein the at least one processor is further configured to execute the stored instructions to, in response to a maximum number of the CBGs being configured by a higher layer parameter, generate respective HARQ-ACK information bits for the maximum number of the CBGs, and
wherein the HARQ-ACK information bits indicate acknowledgement (ACK) or negative acknowledgement (NACK).

11. The terminal of claim 9, wherein the at least one processor configured to execute the stored instructions to, in response to receiving the PDSCH, generate the HARQ-ACK information for the transport block according to a downlink control information (DCI) format of a physical downlink control channel (PDCCH).

12. The terminal of claim 9,
wherein the at least one processor is further configured to execute the stored instructions to, in response to a maximum number of the CBGs being M, group C code blocks to M CBGs,
wherein, if C>M and C is not divided by M, a number of CBs within each of $M_1$ CBGs is $K_1$, and
wherein a number of CBs within each of M2 CBGs is K2, $M_1$=mod(C,M), $$M_2 = M - M_1, K_1 = \left\lceil \frac{C}{M} \right\rceil, \text{ and } K_2 = \left\lfloor \frac{C}{M} \right\rfloor.$$

13. A base station for transmitting and receiving data, the base station comprising:
a transceiver;
at least one memory storing instructions; and
at least one processor configured to execute the stored instructions to:
determine one or more sets of resources including at least one control resource set (CORESET) of one or more CORESETs configured to a terminal,
control the transceiver to:
transmit, to the terminal, a higher layer signaling configuring the one or more sets of resources,
transmit, to the terminal, the PDSCH using resources other than at least one set of resources, dynamically indicated as not available for a physical downlink shared channel (PDSCH) among the configured one or more sets of resources, and
receive, from the terminal, HARQ-ACK information generated according to the PDSCH.

\* \* \* \* \*